(12) United States Patent
VanWyk et al.

(10) Patent No.: US 11,458,386 B2
(45) Date of Patent: Oct. 4, 2022

(54) CONTROLLER WITH ADJUSTABLE FEATURES

(71) Applicant: Valve Corporation, Bellevue, WA (US)

(72) Inventors: Eric Judson VanWyk, Seattle, WA (US); Lucas Allen Whipple, Seattle, WA (US); John Ikeda, Seattle, WA (US); Benoit Collette, Seattle, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 17/174,216

(22) Filed: Feb. 11, 2021

(65) Prior Publication Data

US 2021/0252383 A1 Aug. 19, 2021

Related U.S. Application Data

(60) Provisional application No. 62/977,046, filed on Feb. 14, 2020.

(51) Int. Cl.
| | | |
|---|---|---|
| *A63F 13/214* | (2014.01) | |
| *G06F 3/16* | (2006.01) | |
| *A63F 13/215* | (2014.01) | |
| *G06F 3/01* | (2006.01) | |
| *H04R 5/04* | (2006.01) | |
| *A63F 13/24* | (2014.01) | |
| *A63F 13/218* | (2014.01) | |

(52) U.S. Cl.
CPC .......... *A63F 13/214* (2014.09); *A63F 13/215* (2014.09); *A63F 13/24* (2014.09); *G06F 3/017* (2013.01); *G06F 3/165* (2013.01); *H04R 5/04* (2013.01); *A63F 13/218* (2014.09)

(58) Field of Classification Search
CPC ........ A63F 13/214; A63F 13/24; G06F 3/017; G06F 3/165; H04R 2430/01; H04R 2499/11
See application file for complete search history.

(56) References Cited

U.S. PATENT DOCUMENTS

| | | |
|---|---|---|
| 6,570,078 B2 | 5/2003 | Ludwig |
| 8,754,746 B2 | 6/2014 | Lukas et al. |
| | (Continued) | |

OTHER PUBLICATIONS

SlagCoin Instruction Manual for a Joystick Controller "SlagCoin Appendix—Joystick Controller" last updated Feb. 25, 2009 www.slagcoin.com/joystick.html 52 pages.

(Continued)

*Primary Examiner* — Thomas J Hong
*Assistant Examiner* — Carl V Larsen
(74) *Attorney, Agent, or Firm* — Lee & Hayes, P.C.

(57) ABSTRACT

Controllers that allow for adjusting various features of the controller are disclosed. The controller may include may include one or more speakers for outputting sound or audio content. A user may contact one or more of the speakers with a finger(s) to adjust a characteristic of the audio content and/or to adjust audio settings. For example, a user may touch a speaker with his/her finger to change (e.g., increase or decrease) the volume or to mute the sound. In some instances, the speakers may be located on the controller body of the handheld controller for convenient and quick access by the user.

20 Claims, 16 Drawing Sheets

(56) References Cited

U.S. PATENT DOCUMENTS

| | | | |
|---|---|---|---|
| 9,950,256 B2* | 4/2018 | Lim | A63F 13/214 |
| 10,156,910 B1* | 12/2018 | Shi | H04R 1/2803 |
| 10,427,035 B2 | 10/2019 | Schmitz et al. | |
| 10,441,881 B2 | 10/2019 | Burgess et al. | |
| 2006/0111180 A1 | 5/2006 | Cheng | |
| 2008/0261695 A1 | 10/2008 | Coe | |
| 2009/0205878 A1 | 8/2009 | Taylor | |
| 2011/0007908 A1* | 1/2011 | Rosener | H04R 1/1041 |
| | | | 381/74 |
| 2011/0136479 A1* | 6/2011 | Kim | H04M 1/6016 |
| | | | 455/418 |
| 2013/0127980 A1 | 5/2013 | Haddick et al. | |
| 2015/0029112 A1* | 1/2015 | Macours | G06F 1/1688 |
| | | | 345/173 |
| 2016/0057555 A1* | 2/2016 | Schuster | G06F 3/011 |
| | | | 381/59 |
| 2016/0361641 A1* | 12/2016 | Koizumi | G06F 3/017 |
| 2017/0026735 A1* | 1/2017 | Li | H04R 5/033 |
| 2017/0189800 A1 | 7/2017 | Crain | |
| 2017/0220171 A1* | 8/2017 | Shin | G06F 3/165 |
| 2018/0243647 A1* | 8/2018 | Komori | A63F 13/211 |
| 2019/0227636 A1* | 7/2019 | Lopez Gil | G06F 3/017 |
| 2020/0145747 A1* | 5/2020 | Bunney | G06F 3/04883 |

OTHER PUBLICATIONS

WICO Corporation Consumer Division Manual for "WICO Command Control" Trackball controller, 1982, 6 pages.

PCT Search Report and Written Opinion for PCT Application No. PCT/US21/17951, dated May 3, 2021, 8 pages.

\* cited by examiner

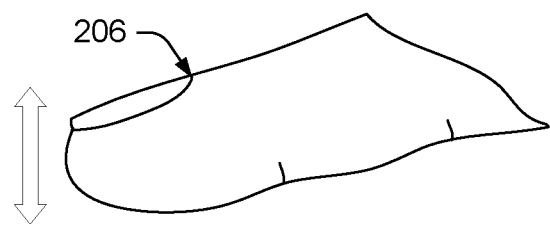
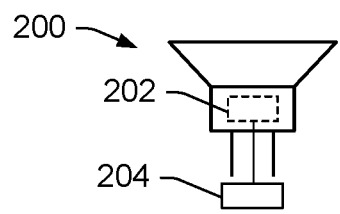
FIG. 2
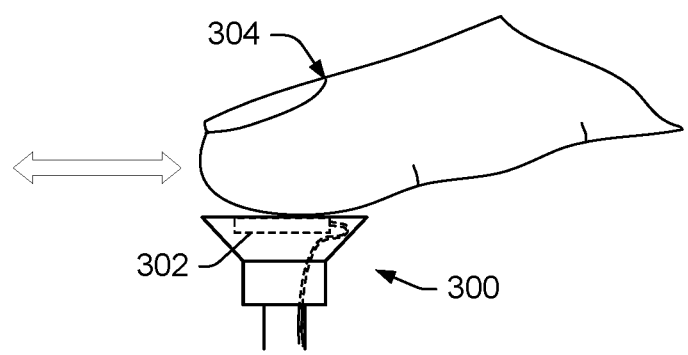
FIG. 3

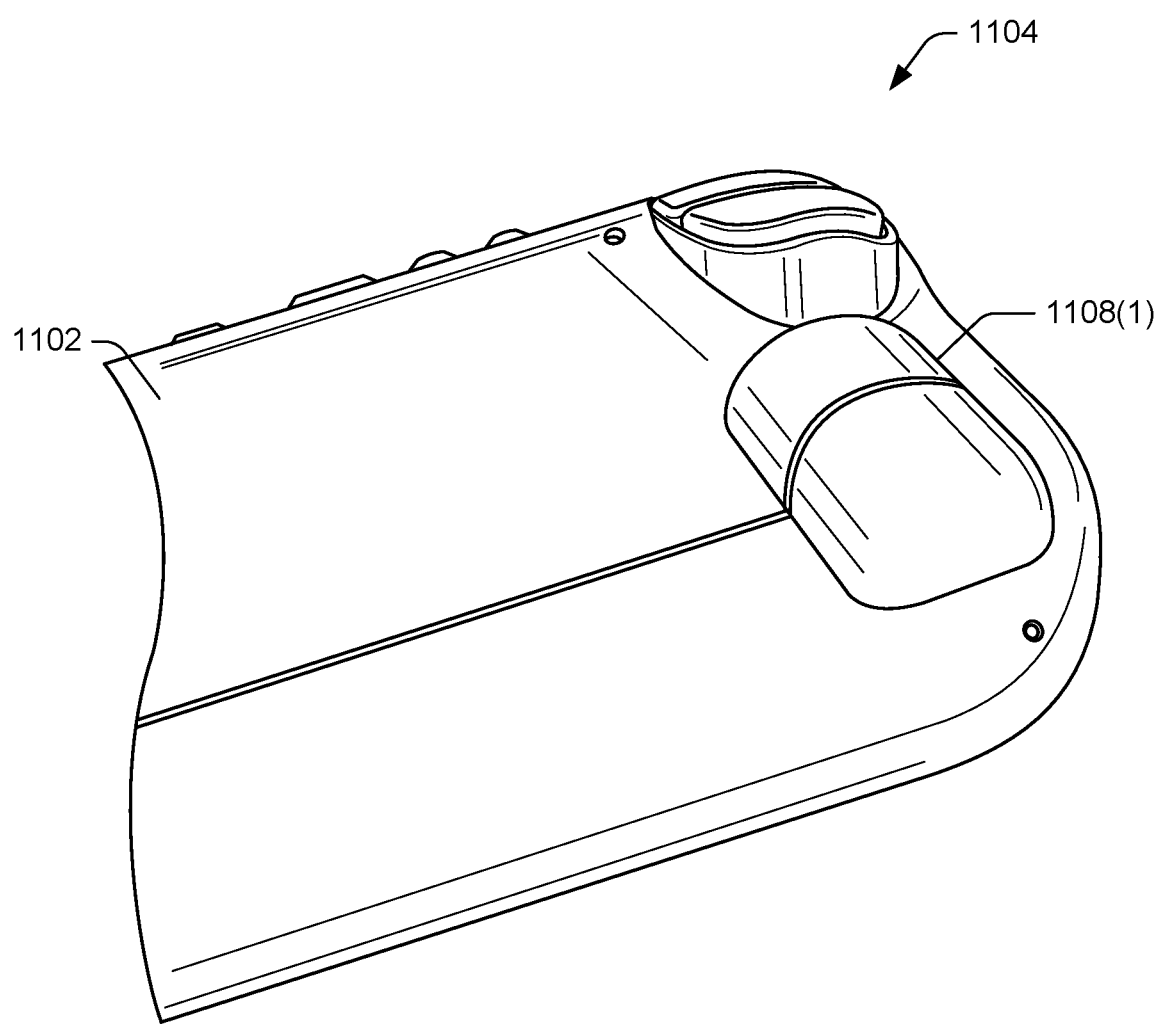
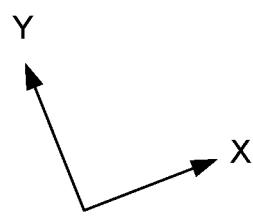
FIG. 12

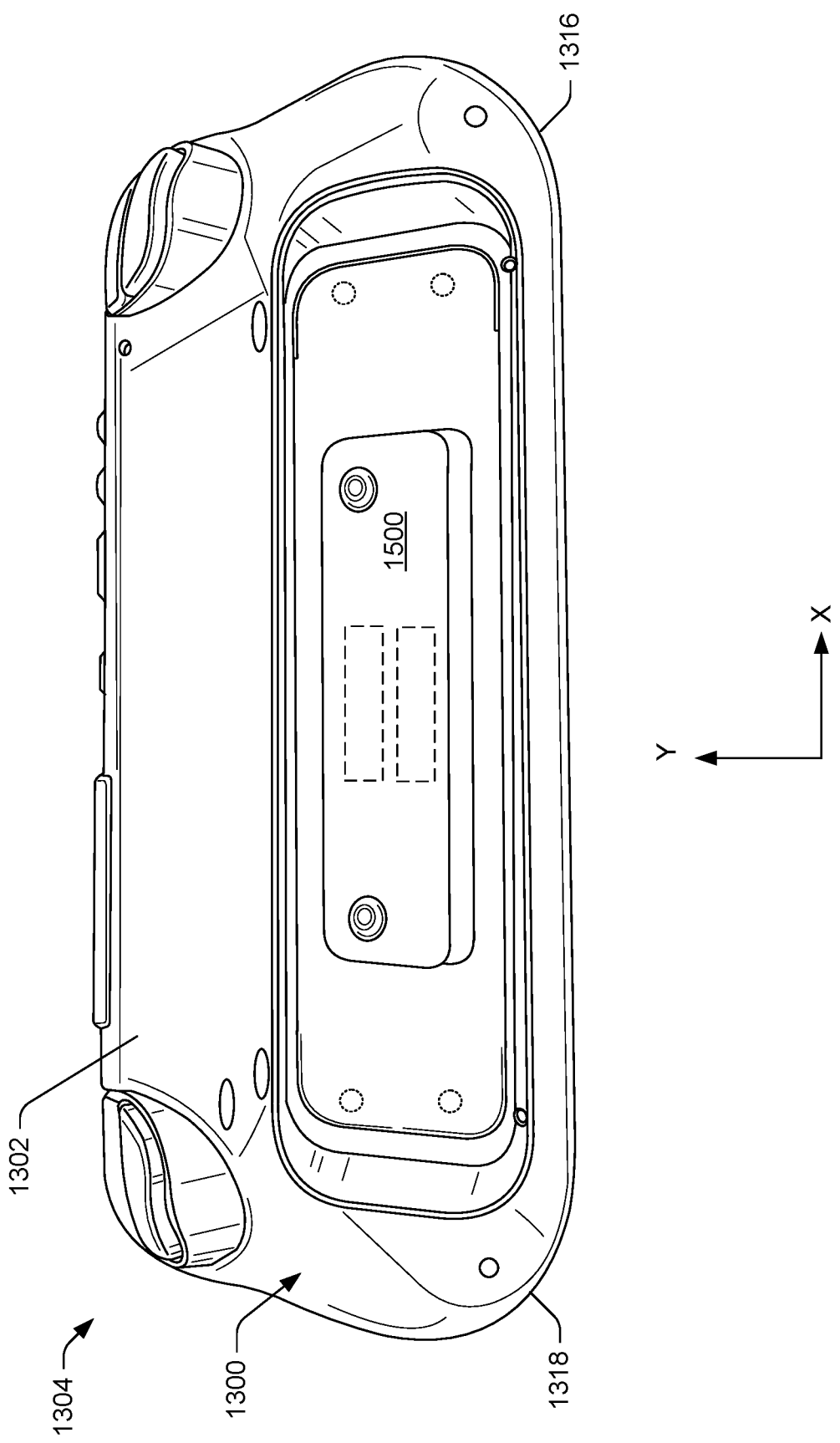

CONTROLLER WITH ADJUSTABLE FEATURES

CROSS REFERENCE TO RELATED APPLICATION

This application claims priority to commonly assigned U.S. Provisional Patent Application Ser. No. 62/977,046, entitled "CONTROLLER WITH ADJUSTABLE FEATURES," and filed on Feb. 14, 2020, the entirety of which is incorporated herein by reference.

BACKGROUND

Handheld controllers are used in an array of architectures for providing input, for example, to a local or remote computing device. For instance, handheld controllers are utilized in the gaming industry to allow players to interact with a personal computing device executing a gaming application, a game console, a game server, the handheld controller itself, or the like. While current handheld controllers provide a range of functionality, further technical improvements may enhance user experiences that these controllers offer.

BRIEF DESCRIPTION OF THE DRAWINGS

The detailed description is described with reference to the accompanying figures. In the figures, the left-most digit(s) of a reference number identifies the figure in which the reference number first appears. The same, or like, reference numbers in different figures indicate similar or identical items.

FIG. 2 illustrates an example technique for detecting finger contact on a speaker of the handheld controller.

FIG. 3 illustrates another example technique for detecting finger contact on a speaker of the handheld controller, and/or for detecting a gesture of the finger on the speaker, as well as a directionality of the gesture.

FIG. 12 illustrates a rear view of an example handheld controller, such as the handheld controller of FIG. 9, that includes, in part, one or more receptacles for receiving one or more add-on components.

FIG. 15 illustrates a rear view of the handheld controller of FIG. 13, that includes, in part, a third back cover for providing the controller with augmented features. The third back cover may be interchangeable with the first back cover of FIG. 13 and/or the second back cover of FIG. 14 to provide the handheld controller with different functionalities.

In FIG. 16A, the knob is shown in a first position corresponding to a first sensitivity of the one or more front-surface controls.

In FIG. 16B, the knob is shown in a second position corresponding to a second sensitivity of the one or more front-surface controls.

DETAILED DESCRIPTION

Figure 1:
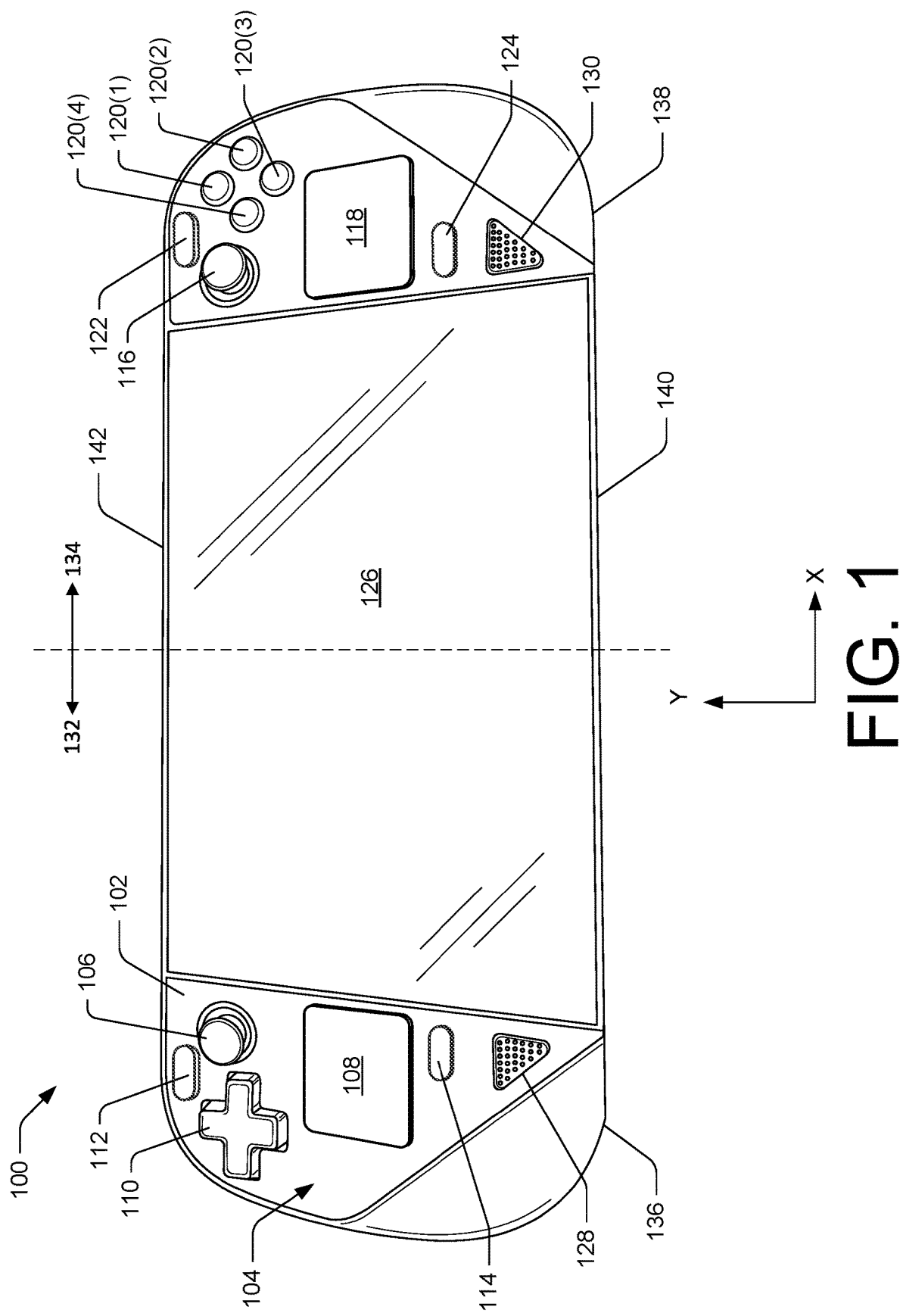
FIG. 1 illustrates a front perspective view of an example handheld controller that includes, in part, one or more speakers. A user operating the handheld controller may adjust a characteristic of audio content being output by the speaker(s) by contacting the speaker(s) with a finger(s).

As mentioned above, handheld controllers are used in a range of environments and include a range of functionality. However, some traditional handheld controllers include a static configuration despite the fact that different users may have different configuration needs, grips, and/or preferences.

Described herein are, among other things, handheld controllers having various controls to engage in video game play via an executing video game application, and/or to control other types of applications and/or programs. In some instances, the handheld controller may include controls for controlling a game or application running on the handheld controller itself (e.g., a standalone, handheld gaming system that is substantially self-contained on the controller). In some instances, the handheld controller may include controls for controlling a remote device (e.g., a television, audio system, personal computing device, game console, etc.). The handheld controller may include one or more controls, including one or more front-surface controls on a front surface of a housing of the handheld controller. These front-surface controls may include one or more joysticks, directional pads (D-pads), trackpads, trackballs, buttons, or other controls that are controllable, for instance, by a thumb of a user of the handheld controller.

Additionally, or alternatively, the handheld controller may include one or more top-surface controls residing on a top surface of a housing of the handheld controller. These top-surface controls may be referred to as "triggers," "bumpers," or the like, and may be controllable by one or more fingers of the user, such as a middle finger, an index finger, or the like. In some instances, the handheld controller includes one or more top-surface controls that are operable by one or more fingers of a left hand and/or one or more fingers of a right hand of the user. In addition, the handheld controller may include one or more back-surface controls. In some instances, the back-surface controls may include one or more controls operable by a left hand of a user and/or a right hand of the user.

The handheld controllers described herein allow for different configurations depending on the needs of different applications (e.g., game titles), users, and the like. Thus, the techniques described herein enable a dynamically configurable handheld controller that remedies some of the current deficiencies of traditional handheld controllers, as discussed above.

In some instances, the handheld controller may include one or more speakers for outputting sound or audio content. The audio content may be associated with an executing game or application. The speaker(s) may be located on the front, sides, top, bottom, and/or back of the handheld controller. A user may contact one or more of the speakers with a finger(s) to adjust a characteristic of the audio content and/or to adjust audio settings. For example, a user may touch a speaker with his/her finger to change (e.g., increase or decrease) the volume or to mute the sound. In some instances, the speakers may be located on the controller body of the handheld controller for convenient and quick access by the user. For example, a first speaker may be located on a front surface of the controller body on or within a left side, left half, or left handle of the handheld controller, while a second speaker may be located on the front surface of the controller body on or within a right side, right half, or right handle of the handheld controller. In some instances, the left thumb of the user may easily access the first speaker and contact the speaker with the left thumb to increase, decrease, and/or mute the volume while the left hand is holding the controller. Additionally, or alternatively, the right thumb of the user may easily access the second speaker to contact the speaker with the right thumb to increase, decrease, or mute the volume while the right hand is holding the controller. In some instances, touching the first speaker may decrease the volume while touching the second speaker may increase the volume, or vice versa. As another example, touching the first speaker and the second speaker at the same time (or substantially the same time) may mute/unmute the volume. As yet another example, a user may swipe in a particular direction (e.g., up, down, left, or right) on the speaker(s) to adjust a characteristic of the audio content being output by the speaker(s).

In some examples, one or more sensors may be used to detect or sense finger contact on the speaker, and possibly a press on the speaker and/or a gesture (e.g., a swipe gesture) on the speaker. Accordingly, the characteristic (e.g., volume) of the audio content being output by the speaker(s) may be adjusted based at least in part on the sensor data received from the sensor(s). Various example types of sensors are described herein for detecting or sensing finger contact on a speaker(s) including, without limitation, inductive sensors, capacitive sensors, impedance sensors, and/or microphones.

An example controller system may include a processor(s) and a controller including a controller body, a speaker disposed on the controller body, and a sensor associated with the speaker and configured to detect finger contact on the speaker. The controller system may further include logic configured to receive, from the sensor, data indicating that a finger is contacting the speaker, and to cause a characteristic of audio content being output by the speaker to be adjusted based at least in part on the data. Allowing for control of audio characteristics via user interaction with speakers disposed on the controller may provide users with an intuitive and convenient way to adjust audio characteristics while operating the controller. For example, a user's attention can remain on a video game being played while adjusting the volume or muting or unmuting the sound by conveniently touching a speaker that is disposed in the vicinity of other controls being used to play the video game.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

FIG. 1 illustrates a front view of an example controller 100 according to an embodiment of the present disclosure. The controller 100 may be considered to be hand-held if it is operated by the hands of a user, whether or not the entire controller 100 is supported by or within the hands of the user. However, in accordance with various embodiments described herein, the terms "device," "handheld device," "handheld game device," "handheld console," "handheld game console," "controller," and "handheld controller" may be used interchangeably herein to describe any device like the controller 100.

The controller 100 may include a controller body 102 having a front surface 104. The controller body 102 may further include a back surface (or back), a top surface (or top edge, or top), a bottom surface (or bottom edge, or bottom), a left surface (or left edge, or left), and a right surface (or right edge, or right). Accordingly, the controller body 102 may be a cuboid. The front surface 104 and the back surface may be relatively large surfaces compared to the top, bottom, left, and right surfaces.

As illustrated in FIG. 1, the front surface 104 of the controller body 102 may include a plurality of controls configured to receive input of the user. Touch data generated by the controls may be used to detect a presence, location, and/or gesture of a finger of a user operating the controller 100. In some instances, the front surface 104 of the controller body 102 may include one or more front-surface controls that are, in some instances, controllable by one or more thumbs of the user operating the controller 100.

Although not shown in FIG. 1, the handheld controller 100 may further include one or more top-surface controls residing on a top surface (or top edge) of the controller body 102. These top-surface controls may include, without limitation, triggers, bumpers, or the like, and the top-surface controls be controllable by one or more fingers of the user, such as a middle finger, an index finger, or the like. Additionally, or alternatively, the handheld controller 100 may include one or more back-surface controls residing on the back surface of the controller body 102 and operable by fingers of a left hand and/or a right hand of the user. Additionally, or alternatively, the handheld controller 100 may include one or more left-surface controls and/or right-surface controls residing on respective left and right surfaces of the controller body 102.

The front-surface controls may include one or more trackpads, trackballs, joysticks, buttons, directional pads (D-pads), or the like, as described in more detail below. For example, the front surface 104 may include a left joystick 106, a left trackpad 108, and/or a left D-pad 110 controllable by a left thumb of the user. In some embodiments, the front surface 104 may include additional left buttons controllable by the left thumb, such as the button 112 and the button 114. The front surface 104 may also include a right joystick 116, a right trackpad 118, and/or one or more right buttons 120(1)-(4) (e.g., X, Y, A, and B buttons) controllable by a right thumb of the user. In some embodiments, the front surface 104 may include additional right buttons controllable by the right thumb, such as the button 122 and the button 124. However, the front 104 may include other controls, such as tilting button(s), trigger(s), knob(s), wheel(s), and/or trackball(s) and the plurality of controls may be configured to receive input from any combination of thumbs and/or fingers of the user. In some instances, the trigger(s) may be multi-direction triggers configured to be pushed away from the controller 100 and pulled towards the handheld controller 100.

In some embodiments, the trackpads 108 and 118 are quadrilateral-shaped trackpads. For example, the trackpads 108 and 118 may be generally square-shaped trackpads. Furthermore, the quadrilateral-shaped trackpads 108 and 118 may have rounded corners. Additionally, as shown in FIG. 1, a straight side edge of each trackpad 108 and 118 is aligned with (e.g., parallel to) the side (e.g., left and right) edges of a display 126 in a center of the controller body 102 on the front surface 104 of the controller body 102. As compared to circular trackpads, the quadrilateral-shaped trackpads 108 and 118 provide extra space at the corners that can be accessed by a finger (e.g., a thumb) of a user. Accordingly, the quadrilateral-shaped trackpads 108 and 118 may be more ergonomic than circular trackpads due to the extra area provided by the trackpads 108 and 118. For example, the quadrilateral shape of the trackpads 108 and 118 may give a user the ability to reorient his/her hands on the controller 100 and still access the trackpads 108 and 118 with his/her thumbs. Additionally, or alternatively, a user may choose to grip the controller body 102 in a slightly different way so that the corners of a trackpad (e.g., the trackpad 108 and 118) are used like the North, South, East, and West parts of the trackpad (e.g., like a diamond-shaped trackpad).

Additionally, the controller 100 may include one or more speakers disposed on the controller body 102, which are configured to output audio content or sound. For instance, a video game or another application being executed on the controller 100 may include audio content that is output during execution of the application (e.g., during gameplay). The speakers may also output other sounds, such as audible notifications.

FIG. 1 illustrates a pair of speakers disposed on the front surface 104 of the controller body, the pair of speakers including a first (left) speaker 128 and a second (right) speaker 130. The left speaker 128 is shown as being located on the front surface 104 and within a left half 132 (or left side) of the front surface 104, while the right speaker 130 is shown as being located on the front surface 104 and within a right half 134 (or right side) of the front surface 104. In some instances, the left speaker 128 and the right speaker 130 may be disposed on, or proximate to, handles of the controller 100. For example, the left speaker 128 may be located adjacent to or on a left handle 136 of the controller 100 configured to be gripped and/or held by a left hand of the user, while the right speaker 130 may be located adjacent to or on a right handle 138 of the controller 100 configured to be gripped and/or held by a right hand of the user. In some instances, the left speaker 128 may be disposed at a location accessible to a left thumb of the user while the left hand is holding the controller 100 by the left handle 136, and the right speaker 130 may be disposed at a location accessible to a right thumb of the user while the right hand is holding the controller 100 by the right handle 138. In some examples, the speakers 128, 130 are disposed on the front surface 104 closer to the bottom edge 140 of the controller body 102 than a top edge 142 of the controller body 102.

Although FIG. 1 illustrates a particular shape and location of the speakers 128, 130, the speakers 128, 130 may be located elsewhere on the controller body 102 (e.g., on other parts on the front surface 104, on other surfaces, such as the back, the top, the bottom, etc.). The speakers 128, 130 may further include a different shape (e.g., spherical, rectangular, oval, etc.). Additionally, the controller 100 may include a single speaker, or more than two speakers.

The user may touch a speaker(s) (e.g., the first speaker 128 and/or the second speaker 130) to control or otherwise adjust an audio characteristic or audio feature of audio content being output by the speaker(s) 128, 130. For example, the left thumb of the user may contact the first speaker 128 to disable, enable, and/or adjust certain audio features, while the right thumb of the user may touch the right speaker 130 to disable, enable, and/or adjust certain audio features. In some instances, the user may touch one or both of the first speaker 128 or the second speaker 130 to mute/unmute audio. In some instances, the user may touch the first speaker 128 and the second speaker 130 substantially simultaneously (e.g., touch the second speaker 130 within a threshold period of time, such as within a second or several milliseconds, since touching the first speaker 128, or vice versa) to mute or unmute audio. In some instances, the user may touch the second speaker 130 to turn the volume up and/or touch the first speaker 128 to turn the volume down, vice versa. In some examples, the user may swipe up or swipe right on a speaker 128 or 130 to turn the volume up and/or swipe down or swipe left on a speaker 128 or 130 to turn the volume down. These are examples of interactions (e.g., gestures) that are intuitive to the user.

In some examples, a sensor(s) associated with the speaker(s) 128, 130 may be configured to detect finger contact on the speaker(s) 128, 130 to determine if an audio characteristic is to be adjusted. Additionally, or alternatively, one or more of the speaker(s) 128, 130 may be depressible to cause actuation of a switch (e.g., a switch(es) disposed underneath the speaker(s) 128, 130), thereby enabling the speaker(s) 128, 130 to be depressed like buttons. The sensor(s) configured to detect finger contact on the speaker(s) 128, 130 may be any suitable type of sensor, examples of which are described in more detail below. In general, the sensor(s) may be configured to sense proximity of a finger to the speaker(s) 128, 130. Accordingly, the sensor(s) may be a proximity sensor(s) (e.g., a touch sensor(s)). Additionally, or alternatively, the sensor(s) may be a pressure sensor(s) configured to detect a press, and/or an amount of force of a press, on the speaker(s) 128, 130.

FIG. 2 illustrates an example technique for detecting finger contact on a speaker 200 of the handheld controller. The speaker 200 depicted in FIG. 2 may be a schematic representation of any of the speakers of the handheld controller 100 described herein, such as the first speaker 128 or the second speaker 130, or both. The speaker 200 may include a speaker coil 202 (sometimes referred to herein as a "voice coil 202"). During operation of the speaker 200, electrical current may flow through the speaker coil 202 to move a diaphragm, frame, suspension, or the like, which creates sound. A sensor 204 may be coupled to the speaker coil 202 and configured to detect or sense a change in an electrical parameter associated with the speaker coil 202 based at least in part on a finger 206 moving into proximity to the speaker coil 202. For example, the sensor 204 may represent an inductive sensor configured to provide inductance data to a processor(s) of the controller system disclosed herein, the inductance data indicating a change in inductance associated with the speaker coil 202 based on the finger 206 moving into proximity to the speaker coil 202. In some embodiments, the sensor 204 may be part of, or may represent, an amplifier (e.g., a smart amp) of the speaker 200. A smart amplifier may be configured to utilize modeling and/or algorithms to produce a robust and rich sound while mitigating damage to the speaker 200. Such a smart amplifier may include or otherwise utilize the sensor 204 to determine a change in inductance caused by the finger 206 moving closer to, or farther from, the speaker coil 202 of the speaker 200, and this may be determined as an audio waveform is driven out of the speaker 200. In this manner, a change in the inductance may be utilized to determine whether a finger 206 is contacting the speaker 200 (e.g., by determining if an inductance value satisfies a threshold inductance).

Alternatively, the sensor 204 may be omitted from the system, and the speaker coil 202 may be configured to function as an inductive sensor (or "pickup") without the use of a separate sensor to detect a chance in inductance. In such a configuration, the speaker coil 202 itself may be configured to detect or sense a change in inductance based at least in part on a finger 206 moving into proximity to the speaker coil 202. A processor(s) of the controller system disclosed herein may be coupled to the speaker coil 202 to receive an indication of this change in inductance sensed by the speaker coil 202 based on the finger 206 moving into proximity to the speaker coil 202, and to adjust an audio characteristic (e.g., volume) according to the change in inductance.

As another example, the sensor 204 may represent a capacitive sensor configured to provide capacitance data to a processor(s) of the controller system disclosed herein, the capacitance data indicating a change in capacitance associated with the speaker coil 202 based on the finger 206 moving into proximity to the speaker coil 202. That is, the sensor 204 may be configured to determine a change in capacitance caused by the finger 206 moving closer to, or farther from, the speaker coil 202 of the speaker 200, and this may be determined as an audio waveform is driven out of the speaker 200. In this manner, a change in the capacitance may be utilized to determine whether a finger 206 is contacting the speaker 200 (e.g., by determining if a capacitance value satisfies a threshold capacitance).

FIG. 3 illustrates another example technique for detecting finger contact on a speaker 300 of the handheld controller, and/or for detecting a gesture of the finger on the speaker 300, as well as a directionality of the gesture. The speaker 300 depicted in FIG. 3 may be a schematic representation of any of the speakers of the handheld controller 100 described herein, such as the first speaker 128 or the second speaker 130, or both. The speaker 300 may include a touch sensor 302 disposed in or on the speaker 300. For example, the touch sensor 302 may represent a capacitive array, much like a trackpad touch sensor, attached to a cover of the speaker 300. The touch sensor 302 may be configured to sense or determine a presence, location, and/or gesture of a finger 304 contacting the speaker 300. For example, the touch sensor 302 may detect or sense whether the finger 304 is contacting a surface of the speaker 300 based on capacitance values satisfying (e.g., meeting or exceeding, strictly exceeding) a threshold. Although a capacitive-type sensor is described, the touch sensor 302 may including, without limitation, a resistive sensor, an infrared sensor, a touch sensor that utilizes acoustic soundwaves to detect a proximity of a finger 304, and/or another sensor for detecting the presence, location, and/or position of an object that is in proximity to the speaker 300, such as the finger 304. In implementations that utilize capacitive-based sensing, the touch sensor 302 may include electrodes (e.g., a transmitter electrode and a receiver electrode of a transcapacitive-type sensor), and voltage can be applied to the electrodes so that the electrodes are configured to measure capacitance changes at the electrodes, which can be translated into sensor data in the form of capacitance values that are indicative of proximity of an object to the sensor 302. For example, capacitance changes at the electrodes of a capacitive-based touch sensor(s) may be influenced by an object (such as the finger) that is in proximity to the electrodes. Furthermore, logic of the controller system may be configured to analyze the touch data generated by the touch sensor 302 to identify a gesture of the finger 304 on the speaker 300, such as the finger 304 moving in a certain direction (e.g., a swipe gesture), at a certain speed, and/or the like, as well as a direction of the gesture (e.g., up, down, left, or right relative within a fixed reference plane, such as the X-Y plane shown in FIG. 1). A processor(s) may then adjust an audio characteristic (e.g., a volume) of audio content based on the gesture (e.g., based on a direction of a swipe gesture).

Figure 4:
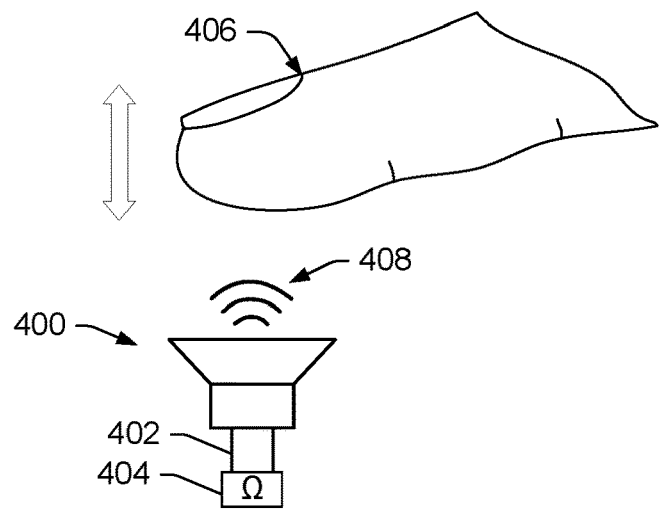
FIG. 4 illustrates another example technique for detecting finger contact on a speaker of the handheld controller.

FIG. 4 illustrates an example technique for detecting finger contact on a speaker 400 of the handheld controller. The speaker 400 depicted in FIG. 4 may be a schematic representation of any of the speakers of the handheld controller 100 described herein, such as the first speaker 128 or the second speaker 130, or both. The speaker 400 may include leads 402, such as the leads of the speaker coil (or voice coil) of the speaker 400. A sensor 404 may be coupled to the leads 402 and configured to detect or sense a change in electrical impedance between the speaker leads 402 based at least in part on a finger 406 moving into proximity to the speaker. For example, the sensor 404 may represent an impedance sensor configured to provide impedance data to a processor(s) of the controller system disclosed herein, the impedance data indicating a change in impedance between the pair of leads 402 of the speaker 400 based on the finger 406 moving into proximity to the speaker 400. That is, if the finger 406 covers the speaker 400 by contacting the speaker 400 and therefore muffles the sound 408 that is being output from the speaker 400, the acoustic impedance of the speaker 400 may change, which, in turn, may cause a change in the electrical impedance between the speaker leads 402. In some implementations, the impedance sensor 404 may be part of, or may represent, an amplifier (e.g., a smart amp) of the speaker 400, which may be configured to determine a change in impedance between the speaker leads 402 caused by the finger 406 moving closer to, or farther from, the speaker 400 and thereby muffling, or ceasing to muffle, the sound 408 that is being output from the speaker 400, and this may be determined as an audio waveform is driven out of the speaker 400. In this manner, a change in the electrical impedance may be utilized to determine whether a finger 406 is contacting the speaker 400 (e.g., by determining if an impedance value satisfies a threshold impedance).

Figure 5:
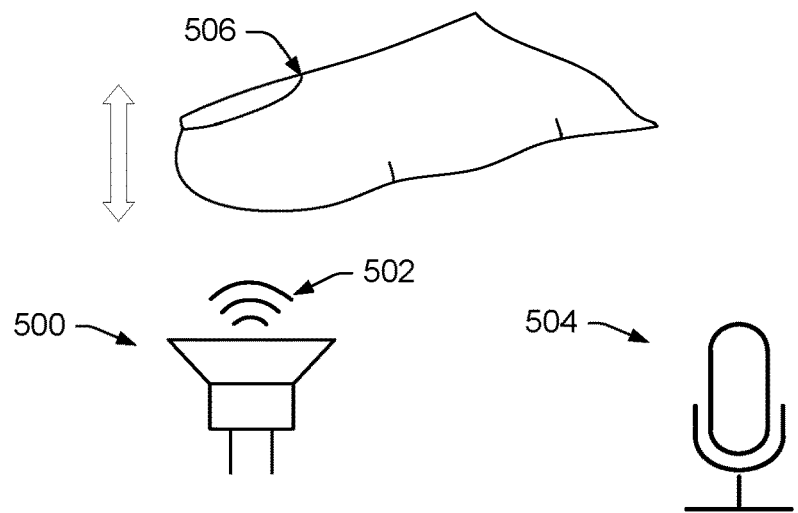
FIG. 5 illustrates another example technique for detecting finger contact on a speaker of the handheld controller.

FIG. 5 illustrates an example technique for detecting finger contact on a speaker 500 of the handheld controller. The speaker 500 depicted in FIG. 5 may be a schematic representation of any of the speakers of the handheld controller 100 described herein, such as the first speaker 128 or the second speaker 130, or both. The speaker 500 may be configured to output one or more tones 502 at a frequency that is inaudible to a human ear. Accordingly, such a tone(s) 502 are sometimes referred to herein as "high frequency audio (HFA) 502", "high frequency sound 502", or "ultrasonic communication 502". The frequency at which tone(s) 502 is/are output using HFA may be greater than a threshold frequency (e.g., greater than about 20 kilohertz (kHz)). In this manner, humans in the vicinity of the speaker 500 (or the controller 100 that includes the speaker 500) that is outputting the tones 502 are unable to hear the tones. The controller 100 may further include a microphone(s) 504 that is configured to detect the broadcast tones 502, such as by generating audio data that exhibits the HFA tone(s) 502. A series of tones 502 may be output on a periodic basis (e.g., every few milliseconds, seconds, or the like) so that the tones 502 are periodically being broadcast from the speaker 500 for use in detecting finger contact. If the finger 506 covers the speaker 500 by contacting the speaker 500 and therefore muffles the tone(s) 502 that is/are being output from the speaker 500, the tone(s) 502 may not be exhibited in the audio data generated by the microphone(s) 504. In other words, the microphone(s) 504 may not be able to detect (or "hear") the tone(s) 502 when the finger 506 is muffling the tone(s) 502 being output by the speaker 500, and, in this scenario, the audio data generated by the microphone(s) 504 may be used to determine whether a finger 506 is contacting the speaker 500 (e.g., by determining if an amplitude of tones exhibited in the audio data above a threshold frequency does not satisfy a threshold amplitude).

The processes described herein are illustrated as collections of blocks in logical flow diagrams, which represent a sequence of operations, some or all of which may be implemented in hardware, software, firmware or a combination thereof (sometimes referred to herein as "logic"). In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

Figure 6:
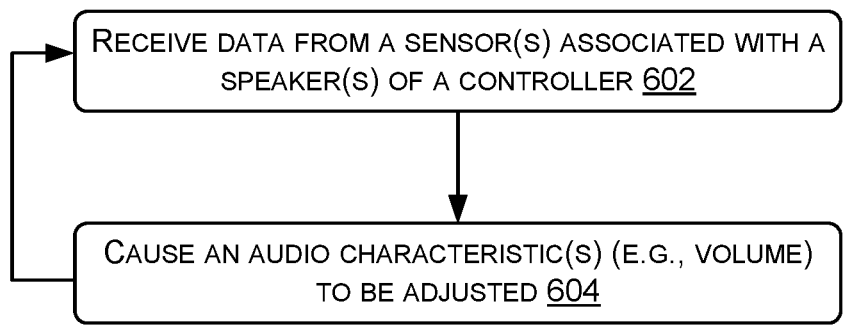
FIG. 6 illustrates an example process for adjusting an audio characteristic of audio content being output from a speaker(s) based at least in part on sensor data.

FIG. 6 illustrates an example process 600 for adjusting an audio characteristic of audio content being output from a speaker(s) based at least in part on sensor data. In some instances, the process 600 may be performed by the controller 100 and/or a remote device communicatively coupled to the controller 100.

At 602, a processor(s) of a controller system, as disclosed herein, may receive data from a sensor(s) associated with a speaker(s) disposed on a controller body 102 of a controller 100, such as the speaker 128 or the speaker 130. The sensor(s) from which the data is received at block 602 may be any of the sensors described herein, such as a sensor configured to detect finger contact on the associated speaker(s). Examples of such a sensor(s) are described above with reference to FIGS. 2-5, such as an inductive or capacitive sensor 204, a touch sensor 302, an impedance sensor 404, and/or a microphone 504. The data received from the sensor(s) at block 602 may indicate that a finger(s) is contacting the speaker(s). If the remote device is the device making this determination, the controller 100 may transmit the sensor data to the remote device and the remote device may process the provided sensor data to detect a finger contacting the speaker(s).

At 604, the processor(s) may cause a characteristic of audio content or sound being output by the speaker(s) to be adjusted based at least in part on the data received at block 602. For example, if the sensor data received at block 602 indicates that a finger is contacting the second (right) speaker 130 (which is disposed on the front surface 104 of the controller body 102 within the right half 134 of the front surface 104), the processor(s) may increase a volume of the audio content or sound being output by the first (left) speaker 128 and the second (right) speaker 130. As another example, if the sensor data received at block 602 indicates that a finger is contacting the first (left) speaker 128 (which is disposed on the front surface 104 of the controller body 102 within the left half 132 of the front surface 104), the processor(s) may decrease a volume of the audio content or sound being output by the first (left) speaker 128 and the second (right) speaker 130. Thus, an intuitive interaction by touching the right speaker 130 to turn the volume up, and/or touching the left speaker 128 to turn the volume down may be provided. As another example, if the sensor data received at block 602 indicates a swipe gesture of a finger has been made on the first (left) speaker 128 and/or the second (right) speaker 130, and if the sensor data indicates that the direction of that swipe gesture is in the upward direction (e.g., the positive Y direction in FIG. 1) or a rightward direction (e.g., the positive X direction in FIG. 1), the processor(s) may increase a volume of the audio content or sound being output by the first (left) speaker 128 and the second (right) speaker 130. A swipe gesture in the opposite direction (e.g., a downward or leftward swipe gesture) may cause the volume to decrease. Other examples include substantially simultaneously touching both speakers 128 and 130 to mute or unmute the audio content, sound, or volume thereof. These are merely examples, and any suitable algorithm can be used to adjust a characteristic of the audio content or sound being output by the speaker(s) 128, 130 at block 604. As shown by the return arrow from block 604 to block 602, the process 600 may iterate as additional sensor data is received indicating various types of finger contact with the speaker(s). For example, the user may adjust the volume up or down, mute or unmute the audio, as desired during gameplay of a video game.

Figure 7:
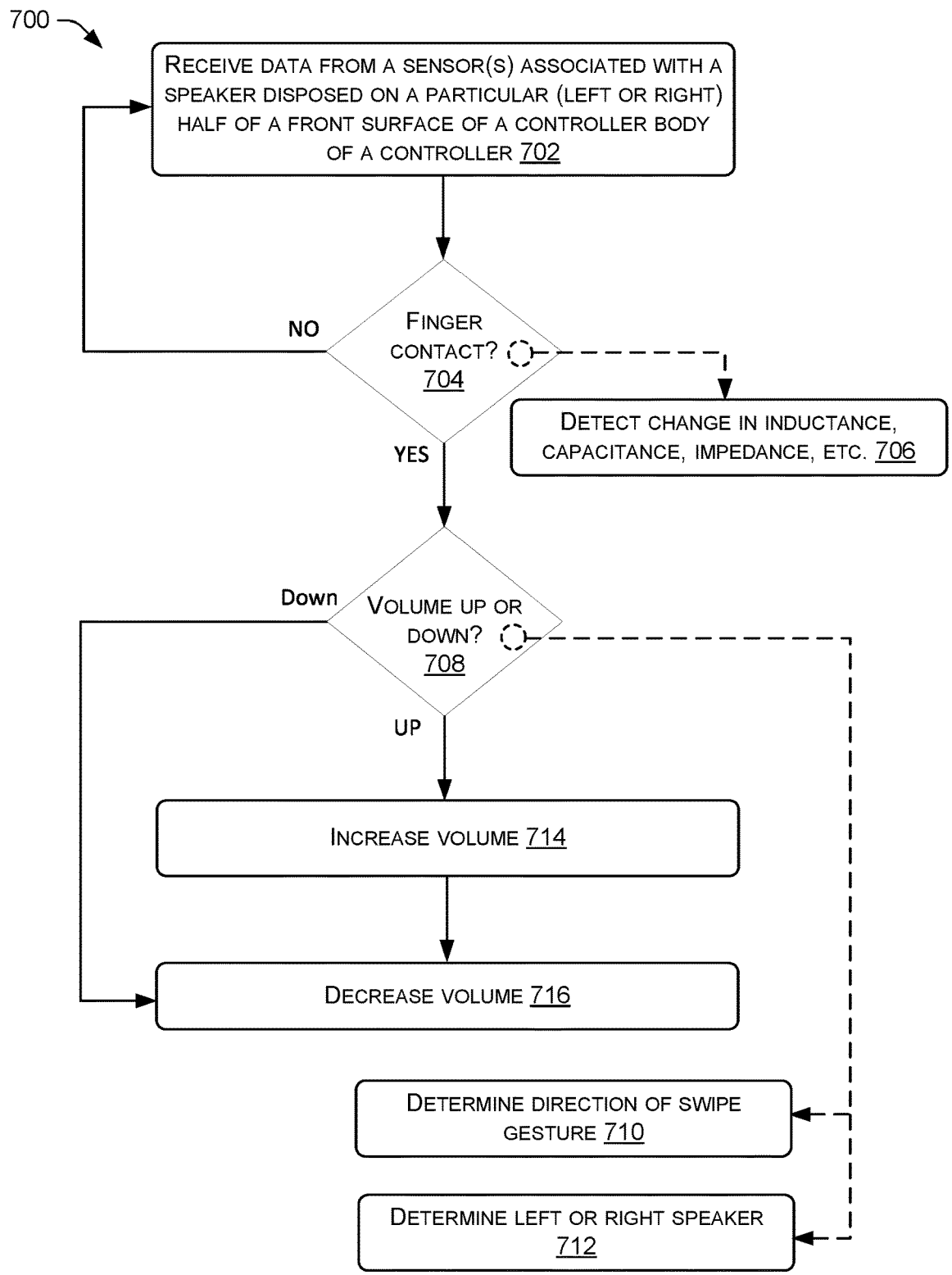
FIG. 7 illustrates an example process for adjusting a volume of audio content being output from a speaker(s) based at least in part on sensor data.

FIG. 7 illustrates an example process 700 for adjusting a volume of audio content being output from a speaker(s) based at least in part on sensor data. In some instances, the process 700 may be performed by the controller 100 and/or a remote device communicatively coupled to the controller 100.

At 702, data may be received from a sensor associated with a speaker that is disposed within a particular half (e.g., the left half 132 or the right half 134) of the front surface 104 of a controller body 102 of a controller 100. For example, the sensor data may be received at block 702 from a sensor associated with the first (left) speaker 128 or from a sensor associated with the second (right) speaker 130 depicted in FIG. 1.

At 704, a determination may be made as to whether a finger is contacting the associated speaker based at least in part on the sensor data received at block 702. As shown by block 706, this determination may be made by detecting a change in an electrical parameter that the sensor is configured to sense. For example, the sensor may be an inductive sensor configured to detect a change in inductance based on the finger moving into proximity to a speaker coil 202 of the speaker, as described herein. As another example, the sensor may be a capacitive sensor configured to detect a change in capacitance based on the finger moving into proximity to the speaker coil 202 of the speaker. As yet another example, the sensor may be an impedance sensor configured to detect a change in impedance between a pair of leads 402 of the speaker. If no finger contact is detected at block 704, the process 700 may follow the NO route from block 704 to block 702 where additional sensor data may be received and the decision at block 704 may iterate. If finger contact is detected at block 704, the process 700 may follow the YES route from block 704 to block 708.

At 708, a determination may be made as to whether to increase or decrease a volume of audio content or sound being output by the speaker(s) of the controller 100 based at least in part on the sensor data received at block 702. As shown by block 710, this determination may be made by determining that a particular gesture has been made by the finger in contact with the speaker, such as a swipe gesture, and/or a direction of the gesture. For example, if a direction of a swipe gesture (e.g., as detected by a touch sensor 302 associated with the speaker) is in the upward or the rightward direction in the X-Y plane shown in FIG. 1, the processor(s) of the controller system may determine to increase the volume, and if the direction of the swipe gesture is in the opposite direction (e.g., downward or leftward), the processor(s) may determine to decrease the volume. As another example, at block 712, the processor(s) may determine that the received sensor data is associated with a particular speaker or a particular half of the front surface 104 of the controller body 102. For example, if the sensor data indicates a finger is contacting the second (right) speaker 130, the processor(s) may determine to increase the volume, whereas, if the sensor data indicates a finger is contacting the first (left) speaker 128, the processor(s) may determine to decrease the volume.

If it is determined, at block 708, to increase the volume, the process 700 may follow the UP route from block 708 to block 714 where the volume of audio content or sound is increased. In some embodiments, this may involve incrementing the volume setting to the next highest increment. The user may touch the speaker and maintain contact to continue increasing the volume at block 714, in some embodiments. If it is determined, at block 708, to decrease the volume, the process 700 may follow the DOWN route from block 708 to block 716 where the volume of audio content or sound is decreased. Again, the user may touch the speaker and maintain contact to continue decreasing the volume at block 716, in some embodiments.

Figure 8:
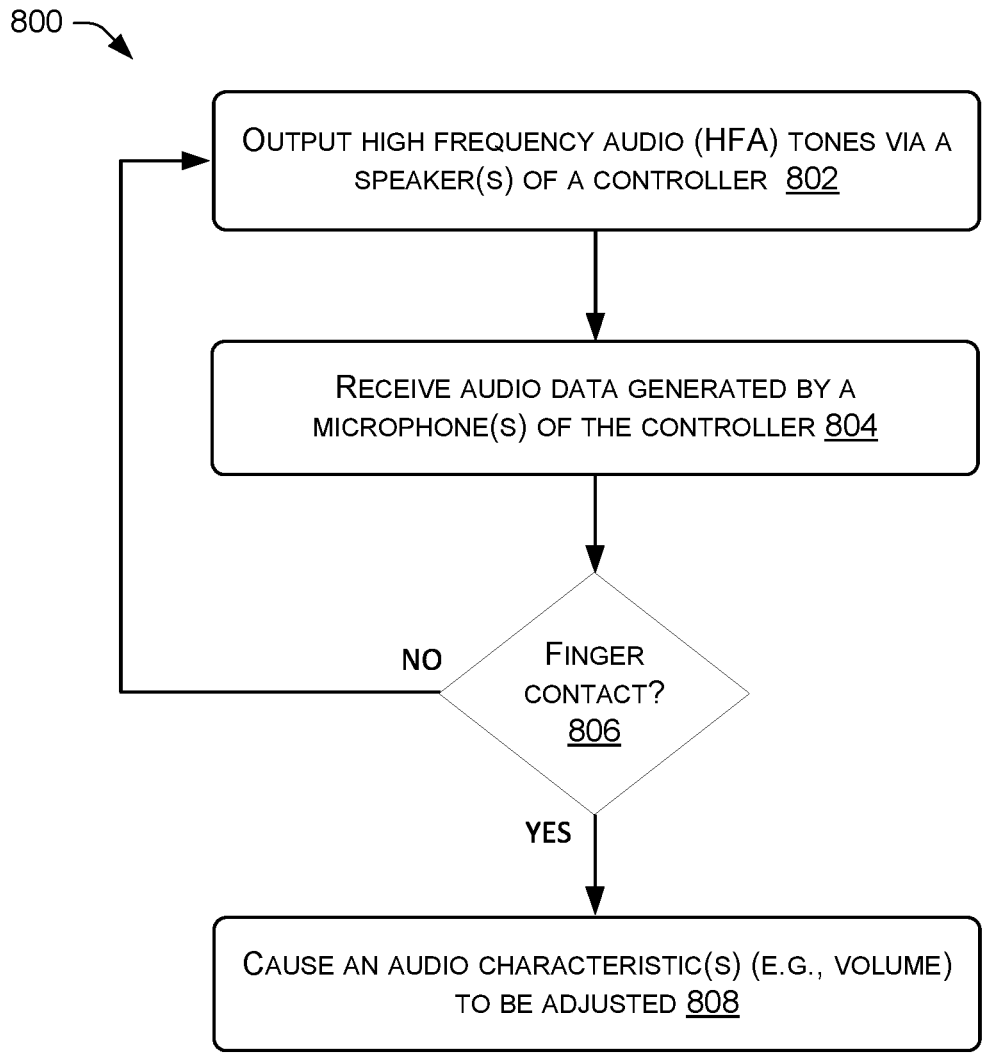
FIG. 8 illustrates an example process for adjusting an audio characteristic of audio content being output from a speaker(s) using high-frequency audio (HFA) tones.

FIG. 8 illustrates an example process 800 for adjusting an audio characteristic of audio content being output from a speaker(s) using high-frequency audio (HFA) tones. In some instances, the process 800 may be performed by the controller 100 and/or a remote device communicatively coupled to the controller 100.

At 802, a speaker(s) of the controller 100 may output one or more tones at a frequency that is inaudible to a human ear (e.g., HFA tones), as described herein. The tone(s) may be output from one speaker or multiple speakers. When tones are output from multiple speakers, each speaker may be configured to output tones at a different frequency. For example, the first (left) speaker 128 may be configured to output first tones at a first frequency greater than about 20 kHz, and the second (right) speaker 130 may be configured to output second tones at a second frequency greater than about 20 kHz.

At 804, a processor(s) of the controller system disclosed herein may receive audio generated by a microphone(s) 504 of the controller 100. For example, the microphone(s) 504 may capture sound in the vicinity of the controller 100 and generate audio data, and if the HFA tones are being emitted by the speaker(s) of the controller 100, the audio data may exhibit those high frequencies. In some embodiments, a microphone 504 is associated with a particular speaker (e.g., a first microphone associated with the first speaker 128, a second microphone associated with the second speaker 130, etc.) and is configured to detect tones of a particular frequency being emitted by the associated speaker. In other embodiments, a single microphone or microphone array may be configured to capture any sound in the environment of the controller 100 including ambient noise, audio content emitted by the speaker(s) of the controller 100, and the HFA tones emitted by one or more of the speakers of the controller 100. In some embodiments, filters may remove, from the audio data, background/ambient noise and/or the audio content associated with a video game in order to isolate the HFA tones.

At 806, a determination may be made as to whether a finger is contacting a speaker(s) based at least in part on the audio data generated by the microphone(s) 504. For example, if the finger is muffling the HFA tones 502 being output by the first (left) speaker 128, the audio content in that high frequency range may be absent or at least below a threshold amplitude in the audio data generated by the microphone(s) 504, which may be indicative of a finger contacting the first (left) speaker 128. A similar technique can be employed to detect finger contact with the second (right) speaker 130, or any other speaker of the controller 100. If finger contact is not detected at block 806, the process 800 may follow the NO route from block 806 to block 802 to continue outputting HFA tones and utilizing the tones for determining finger contact.

If finger contact is detected at block 806, the process 800 may follow the YES route from block 806 to block 808 where the processor(s) may cause a characteristic of audio content or sound being output by the speaker(s) to be adjusted based at least in part on the audio data generated by the microphone(s) 504. For example, if the microphone-generated audio data indicates that a finger is contacting (and therefore muffling sound being output by) the second (right) speaker 130, the processor(s) may increase a volume of the audio content or sound being output by the first (left)

speaker 128 and the second (right) speaker 130. As another example, if the microphone-generated audio data indicates that a finger is contacting (and therefore muffling sound being output by) the first (left) speaker 128, the processor(s) may decrease a volume of the audio content or sound being output by the first (left) speaker 128 and the second (right) speaker 130. Other examples include substantially simultaneously touching (and therefore muffling sound output by) both speakers 128 and 130 to mute or unmute the audio content, sound, or volume thereof. These are merely examples, and any suitable algorithm can be used to adjust a characteristic of the audio content or sound being output by the speaker(s) 128, 130 at block 808.

Figure 9:
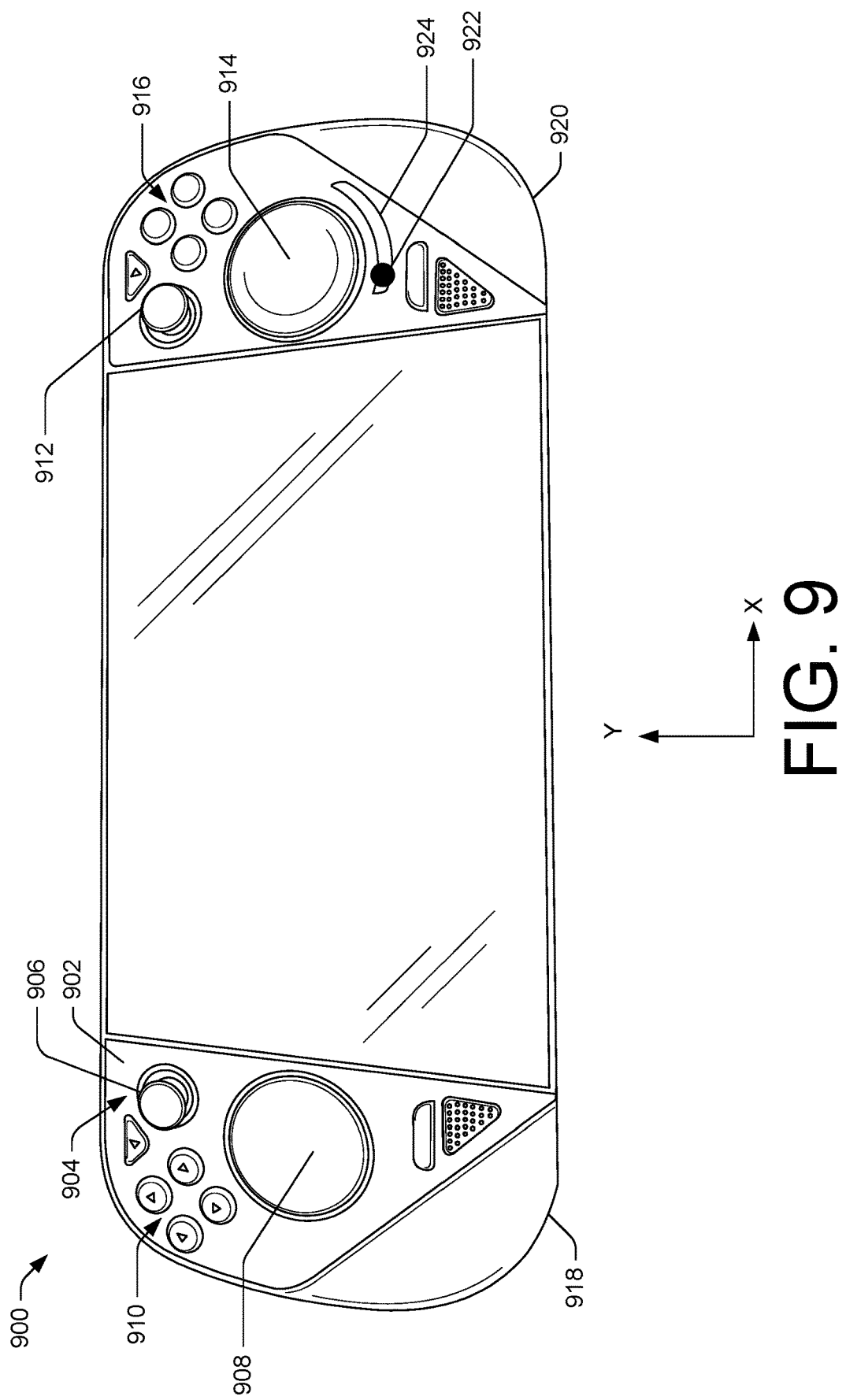
FIG. 9 illustrates a front perspective view of an example handheld controller that includes, in part, a display screen and one or more front-surface controls having a touch sensor for detecting a presence and location of a user operating the handheld controller. The controller may also include mechanisms for adjusting a sensitivity of the one or more front-surface controls. The adjustment features may provide a more universal and/or versatile handheld controller.

FIG. 9 illustrates an example controller 900 having a controller body 902 with a front surface 904. As illustrated, a front surface 904 of the controller body 902 may include a plurality of controls including front-surface controls configured to receive input via the user's thumbs. For example, the controller 900 may include a left joystick 906, a left trackpad 908, a left D-pad 910 in the form of four separate buttons, a right joystick 912, a right trackpad 914, and right buttons 916 (e.g., X, Y, A, B). The controller 100 may include additional controls or features similar to the controller 100 as well. In addition, the controller 900 may include a left handle 918 and a right handle 920, which are configured to be gripped by a user's hands.

In some examples, depending on the game or application, users may desire different feels to increase their comfort and/or may desire certain gameplay experiences. Additionally, users may desire certain features, or a functionality, of the handheld controller. For example, a first gaming application may be best played with use of a first control, while a second gaming application may be best played with use of a second control. Here, a user may select which controls are usable depending on the gaming application currently executing. In this sense, the controls or certain features of the handheld controller may be interchangeable based on user preferences and/or the application. In some instances, the handheld controller may be dynamically configured depending on which user is currently operating the handheld controller. Furthermore, in each of these instances, the handheld controller or a remote system may determine the configuration of the handheld controller and which controls are currently being operated. This information may be provided to a system executing the current application, which in turn may make modifications based on the configuration of the handheld controller.

In some instances, one or more of the front-surface controls may be depressible. For example, trackpads (e.g., the left trackpad 908 and/or the right trackpad 914) may be depressible to allow for detecting the force of a press and/or to enable button-like actuation of the trackpad. However, in some instances, users may prefer to adjust the sensitivity associated with depressing the trackpad, or adjust an amount of force required to depress the trackpad for enabling the button-like action. In some instances, the controller 900 may include a protrusion, lever, or knob 922 for adjusting a sensitivity of one or more of the front-surface controls, such as the right trackpad 914. As shown in FIG. 9, the knob 922 may protrude through a front cover, or on the front 904, of the controller 900. The knob 922 may be manipulated or otherwise actuated by the user to adjust the sensitivity of the right trackpad 914. For example, the knob 922 may slide or reposition within a slot or channel 924 on the front 904. The knob 922 may slide within the channel 924, or between ends of the channel 924, to adjust the sensitivity of the right trackpad 914.

As discussed herein, and shown in later figures, the knob 922 may operably couple to a rotating dial mechanism disposed with the controller body 902. This rotating dial mechanism may adjust the amount of force required to depress the right trackpad 914 and engage one or more switches disposed beneath the right trackpad 914. The knob 922 may also be disposed adjacent to the right trackpad 914. However, the knob 922 may be located at other positions or may protrude through other surfaces of the controller 900 for manipulation by the user. Additionally, or alternatively, rather than sliding the knob 922 back and forth to change the sensitivity, the user may press buttons that actuate motors and change the sensitivity of the trackpads. Furthermore, although FIG. 9 illustrates a particular front-surface control including the knob 922, or that the knob 922 is actuatable to change a sensitivity of a particular front-surface control, other front surface controls may include a corresponding knob (or other feature) for adjusting an associated sensitivity.

Figure 10:
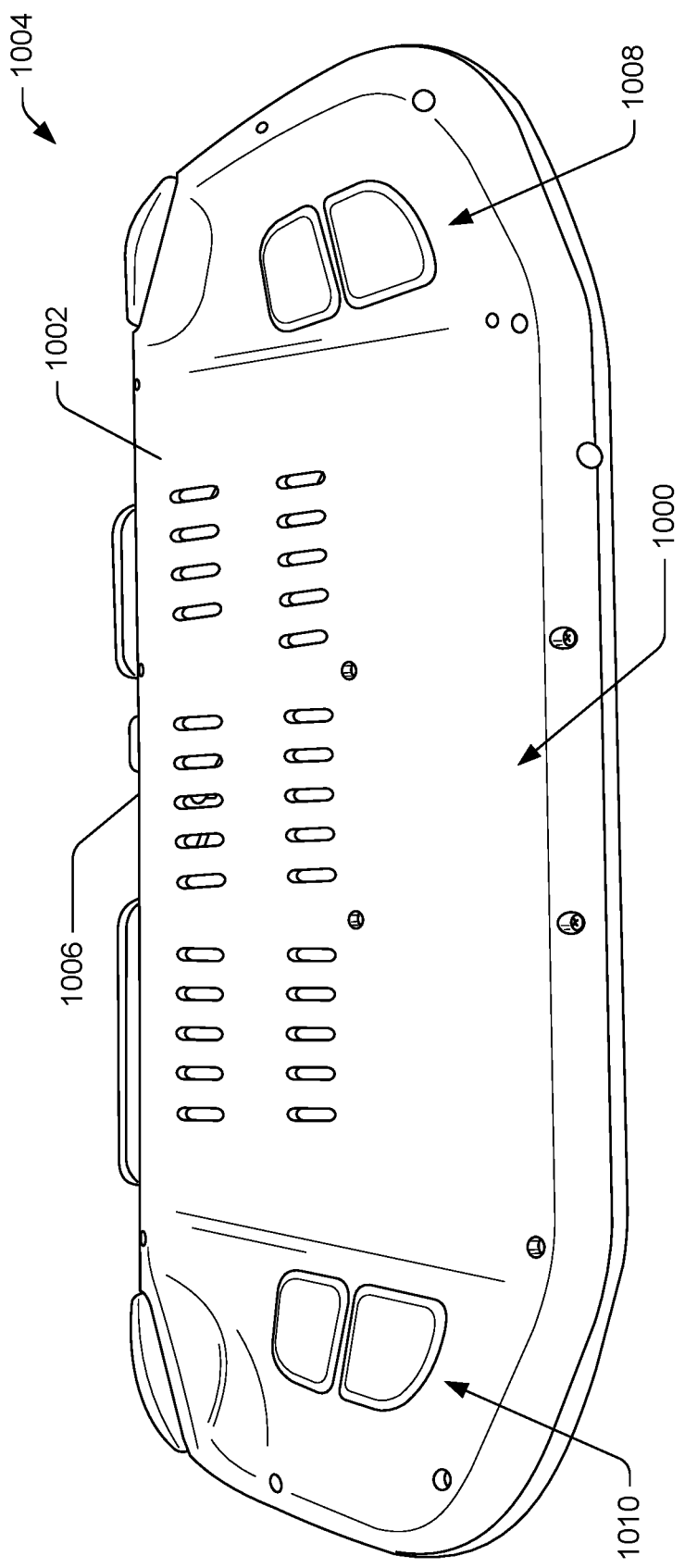
FIG. 10 illustrates a rear view of an example handheld controller, such as the handheld controller of FIG. 9, that includes, in part, one or more rear-surface controls.

FIG. 10 illustrates a back 1000 of a controller body 1002 of a controller 1004, which may represent a back of the controller 100 or the controller 900. FIG. 10 further illustrates a top 1006 of the controller 1004, which may represent or a top of the controller 100 or 900.

The top 1006 may include one or more left trigger(s) and/or one or more right triggers. In some instances, each of the one or more left trigger(s) and/or the one or more right trigger(s) may be located along a top edge of the controller body 1002. The one or more left trigger(s) and/or one or more right trigger(s) may be controlled by index fingers of the user during normal operation while the controller 1004 is held by the user. The top 1006 may additionally, or alternatively, include depressible buttons (or other additional input controls) that may be controllable by fingers of the user. In some instances, the top 1006 may include a touch sensor for detecting the presence, position, and/or gesture of the finger(s) on the control(s). Additionally, the top 1006 may include receiver(s), such as a wired communication interface (e.g., a port, plug, jack, etc.), for communicatively coupling the controller 1004 to external devices (e.g., charger, game console, display, computing device, etc.).

The back 1000 of the controller body 1002 may also one or more left controls 1008 and/or one or more right controls 1010, which may be conveniently manipulated by the index or middle fingers of the user during normal operation while the controller 1004 is held in the hands of the user. The one or more left controls 1008 and/or one or more right controls 1010 may be touch-sensitive to identify the presence, position, and/or gestures of one or more fingers on the control(s).

In addition to providing different controls, the handheld controller may support different interchangeable accessories. For example, portions of the handheld controller gripped or held in the hands of the user may be swapped or interchanged to provide different feels and/or comfort levels. These grips may be varying size, shape, and/or contours to fit in the hands and be gripped by the user. For example, small grips may be used by users with a small hand size while larger grips may be used by users with a large hand size. In some instances, the grips (or handles) may couple within or to receivers located at the back and/or the side(s) of the handheld controller. The different grips may be removably coupled to, or within, the receiver(s). The grips may also provide the user with additional surfaces to clutch or hold when operating the handheld controller. For example, grips may include different degrees of contours and projections, and depending on the application or user preferences, users may select corresponding grips.

In some instances, the handheld controller may include a cavity or compartment located on the back of the handheld controller. The compartment may include controls (e.g., buttons) that are actuatable via a cover disposed over compartment. When attached, the cover may conceal the compartment. Buttons may be disposed within the compartment, and the buttons (or other sensors/switches) may be actuatable via pressing on portions of the cover. For example, applying a press on the cover may engage one or more buttons.

Figure 11:
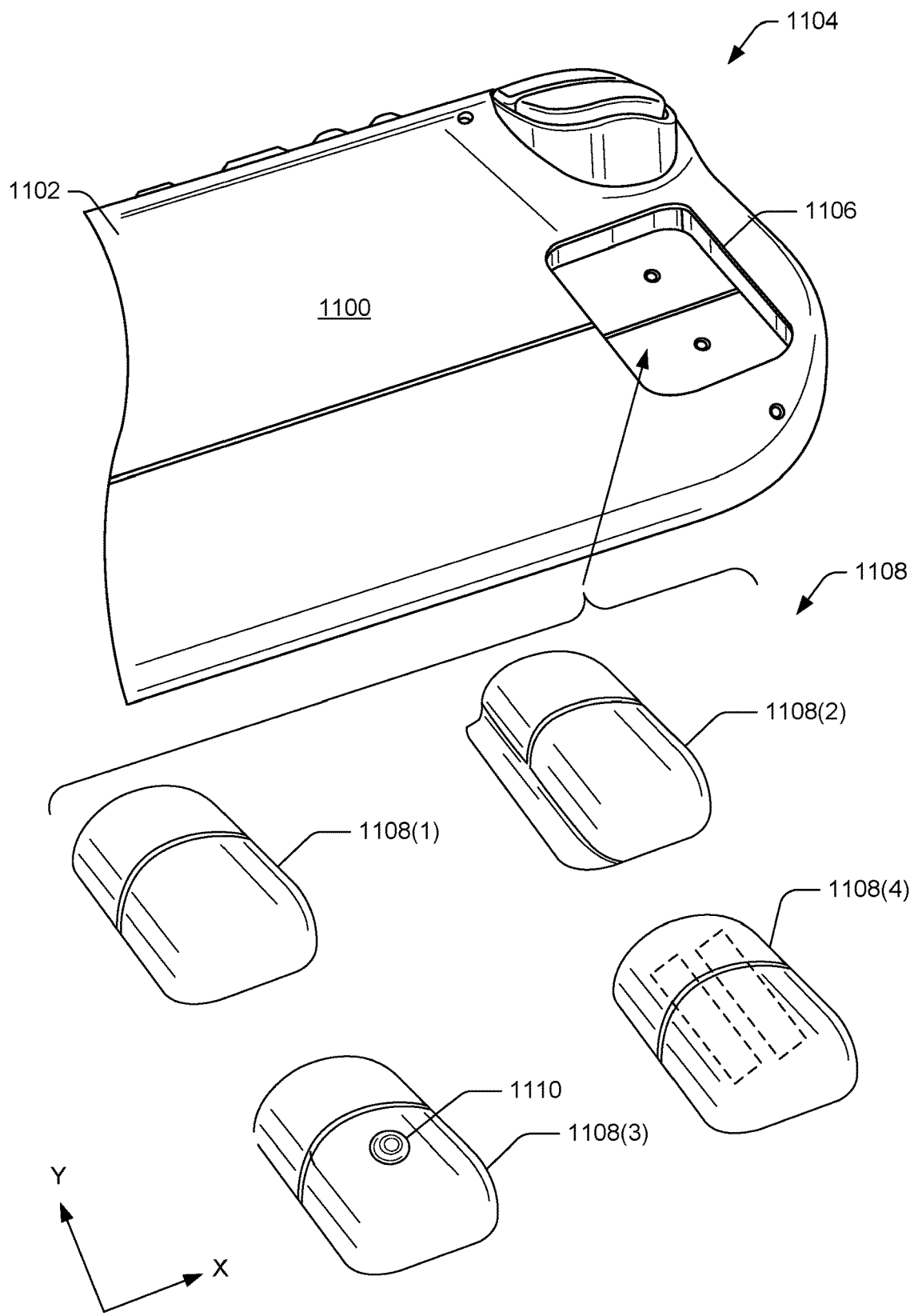
FIG. 11 illustrates a rear view of an example handheld controller, such as the handheld controller of FIG. 9, that includes, in part, one or more receptacles for receiving add-on components. The add-on components may improve ergonomics of the handheld controller and/or provide different functionalities.

FIG. 11 illustrates a back 1100 of a controller body 1102 of a controller 1104, which may represent a back of the controller 100 or the back of the controller 900. The back 1100 of the controller body 1102 may include receptacles 1106 for receiving one or more accessories, and which couple the accessories to the back of the controller body 1102. As shown, the receptacles 1106 may include recesses, pockets, or compartments that are disposed on, into, and/or within the controller body 1102. In some instances, the receptacles 1106 may include sidewalls disposed below a surface of the back 1100 for securing or coupling the accessories to the controller body 1102. Stated alternatively, the receptacles 1106 may include sidewalls that are recessed below a surface of the back 1100 of the controller body 1102. Recessing the receptacles 1106 in this manner may secure the accessories to, or within, the controller body 1102 and prevent the accessories from translating or otherwise shifting during use.

In some instances, the receptacles 1106 may be located on left and right handle portions of the controller body 1102 and which are configured to be gripped or held in the hands of the user, respectively. Here, for example, the receptacles 1106 may receive accessories that are to be gripped or held onto by the user. In other instances, the receptacles 1106 may receive accessories that are to be controlled by fingers of the left and right hands of the user. For example, FIG. 11 illustrates that the receptacle 1106 may be located on a left handle portion of the controller 1104. As discussed herein, an accessory may couple to the controller body 1102 and the left hand of the user may hold the accessory or otherwise utilize the accessory. However, in some instances, the controller 1104 may be operable without an accessory attached to the controller body 1102. In this sense, the accessories may increase the functionality and provide the controller 1104 with certain features.

The one or more accessories may, in some instances, removably couple to the back 1100 of the controller body 1102 within the receptacles 1106 and may be interchangeable with one another. For example, depending on the user, preferences of the user, and/or the application, different accessories may couple to the controller body 1102. In some instances, the accessories may provide for varying grips or provide a surface and/or an area of the controller 1104 in which the user grips or holds onto while operating the controller 1104. In some instances, a user may swap the accessories based on a current application (e.g., game title) that the user is playing, based on comfort of the user, and/or for any other reason.

FIG. 11 illustrates a plurality of accessories 1108 that may be coupled to the controller body 1102. In some instances, a user of the controller 1104 may interchange which of the accessories 1108 couples to the controller body 1102 to change the functionality, look, or feel of the controller 1104. For example, different accessories may include different sizes, textures, shapes, heights, and so forth. In one example, different accessories have different heights, shapes (e.g., convex, concave, flat, etc.), and so forth. For example, a first accessory 1108(1) may represent a first grip configured to couple to the controller body 1102. A second accessory 1108(2) may represent a second grip configured to couple to the controller body 1102. Comparatively, the first accessory 1108(1) and the second accessory 1108(2) may represent differently sized or differently shaped grips having different contours and shapes. For example, the first accessory 1108(1) may be used by users with larger hands while the second accessory 1108(2) may be used by users with smaller hands. In either instance, both the first accessory 1108(1) and the second accessory 1108(2) may provide, or serve as, portions of the controller 1104 gripped by the user (e.g., a left grip held by the user).

The accessories 1108 may also include a third accessory 1108(3) and/or a fourth accessory 1108(4). The third accessory 1108(3) illustrates a grip (or handle) having a button 1110 operable by the user. The user may actuate the button 1110 to cause corresponding actions to be performed within the game and/or application. The fourth accessory 1108(4) may represent an extended battery pack to provide the controller 1104 with extended battery life. Additionally, the accessories 1108 may include touch-sensitive controls to identify the presence, position, and/or gestures of one or more fingers on the control(s).

In some instances, the grips or other accessories may magnetically couple to the back and/or the sides of the handheld controller. This way the grips may be easily interchangeable with one another. However, other attachment mechanisms may be used (e.g., snap-fit, slots, hooks, etc.). Additionally, the grips may also include one or more controls (e.g., buttons). In such instances, the receivers and the grips may include corresponding connectors for transferring touch data, input data, and/or selection data to the handheld controller. For example, the grips may include buttons for controlling aspects of the game or application. In addition to coupling the grip to the handheld controller via attachment mechanisms, for example, a connector on the grip may communicatively couple to a connector of the handheld controller in order to provide data (e.g., indicating a press of the button) to the handheld controller.

Regardless of the type of accessory, or the associated features of the accessories 1108, the accessories 1108 may be removably coupled to the controller body 1102 to add grips, functionality, and/or features to the controller 1104. In some instances, the accessories 1108 may couple to the controller body 1102 through an engagement between attachment mechanisms on the controller body 1102 and attachment mechanisms on the accessories 1108. For example, a bottom surface or other surfaces of the receptacles 1106 may include first magnetic elements (e.g., first magnets) that are complimentary to engage with second magnetic elements (e.g., second magnets) on the accessories 1108. For example, a bottom of the receptacles 1106 may include magnetic elements that engage with magnetic elements located on a bottom surface of the accessories 1108. The engagement or attraction between the first magnetic elements and the second magnetic elements may secure of hold the accessories 1108 within the receptacle 1106 and/or to the controller body 1102. However, the force of engagement between the first magnetic element and the second magnetic element may be overcome via the user applying a greater amount of force. In this manner, the user may interchange or swap out the accessories 1108 attached to the controller body 1102.

However, the accessories 1108 and the controller body 1102 may couple to one another using mechanisms other than magnetic elements. For example, the accessories 1108 may include tabs that engage with hooks of the controller body 1102. Additional attachment mechanisms may include snap-fit, hook and loop, pressure fit, and/or mechanical fasteners. Furthermore, in some instances, the accessories 1108 may include flanges or lips that engage or abut the sidewalls of the receptacles 1106, to further couple or secure the accessories 1108 within the receptacles 1106 or to the controller body 1102.

Additionally, the controller body 1102 may include connectors for communicatively coupling a functionality of the accessories 1108 to the controller 1104, vice versa. In some instances, the connectors may be located within the receptacles 1106 and may receive, or couple to, corresponding connectors of the accessories 1108. For example, in instances where the controller 1104 includes the third accessory 1108(3) or the fourth accessory 1108(4), power from the batteries may be transmitted to the controller via the connectors and data indicating a press of the button may be transmitted to the controller 1104 via the connectors. In some instances, the connectors may represent prong connectors that are complimentary to engage with one another and couple sensors, buttons, and/or a functionality of the accessories to the controller 1104. In some embodiments, the accessories 1108 may wirelessly send/receive data to/from a corresponding transceiver of the controller 1104.

Although FIG. 11 illustrates a particular location, size, or configuration of the receptacles 1106, the receptacles 1106 may be located elsewhere on the controller body 1102. In some instances, more than two receptacles 1106 and more than two accessories 1108 may be coupled to the controller body 1102. Furthermore, while the above discussion illustrates a single accessory being received with the receptacles 1106, the receptacles 1106 may be configured to receive multiple accessories. For example, a first accessory may couple within the receptacle 1106 and engage with a first magnetic element of the magnetic elements, while a second accessory may couple within the receptacle 1106 and engage with a second magnetic element of the magnetic elements. With the interchangeability of the accessories 1108, the user may customize the controller 1104 to his or her preferences and depending on the desired functionality (or feel) of the user. In some instances, the controller 1104 and/or a communicatively coupled system may determine which accessories 1108 are coupled to the controller body 1102 for use in determining a functionality of the controller 1104 and/or the features of the controller 1104 (e.g., tag, RFID, magnets, etc.). For example, after identifying the accessory currently coupled to the controller 1104, the controller 1104 and/or a system communicatively coupled to the controller 1104 may relay the identification of the control of the application being executed by the system. The system may then take this information into account for determining one or more parameters of the application (e.g., calibration and scaling factors associated with the movement of the control). In another example, the application (e.g., game) may enable different movement/control options based on which control currently couples to the receiver.

FIG. 12 illustrates a back view of the controller 1104, showing the first accessory 1108(1) coupled to the controller body 1102 and within the receptacle 1106. Once coupled, the accessory 1108(1) may be secured to the controller 1104 and operable by the user. Additionally, once coupled, the back 1100 of the controller 1104 may have a smooth and continuous surface for the user. As shown, the user may grip the accessory 1108(1) for holding onto or otherwise gripping the controller 1104 within his or her hands.

In some instances, a cover may be interchangeable with other covers depending on the game, application, and/or user preferences. The different covers may provide the handheld controller with additional features and/or may defeature certain features of the handheld controller. For example, the user may couple a cover that defeatures the controls within the compartment. In some instances, this cover may include portions that are not depressible and which do not actuate, or engage, the buttons disposed within the cover. Additionally, the interchangeable covers may include electronics, such as batteries, haptic feedback mechanisms, and so forth. Here, if the user desires increased battery life, for example, the user may couple a cover containing batteries for the handheld controller. If the user desires to receive haptic feedback, for example, during a racing game, the user may couple a cover contain haptic actuators. In such instances, the covers may include electronics and connectors for coupling the electronics of the cover to the handheld controller. For example, a connector of the cover may connect with a connector of the compartment.

Figure 13:
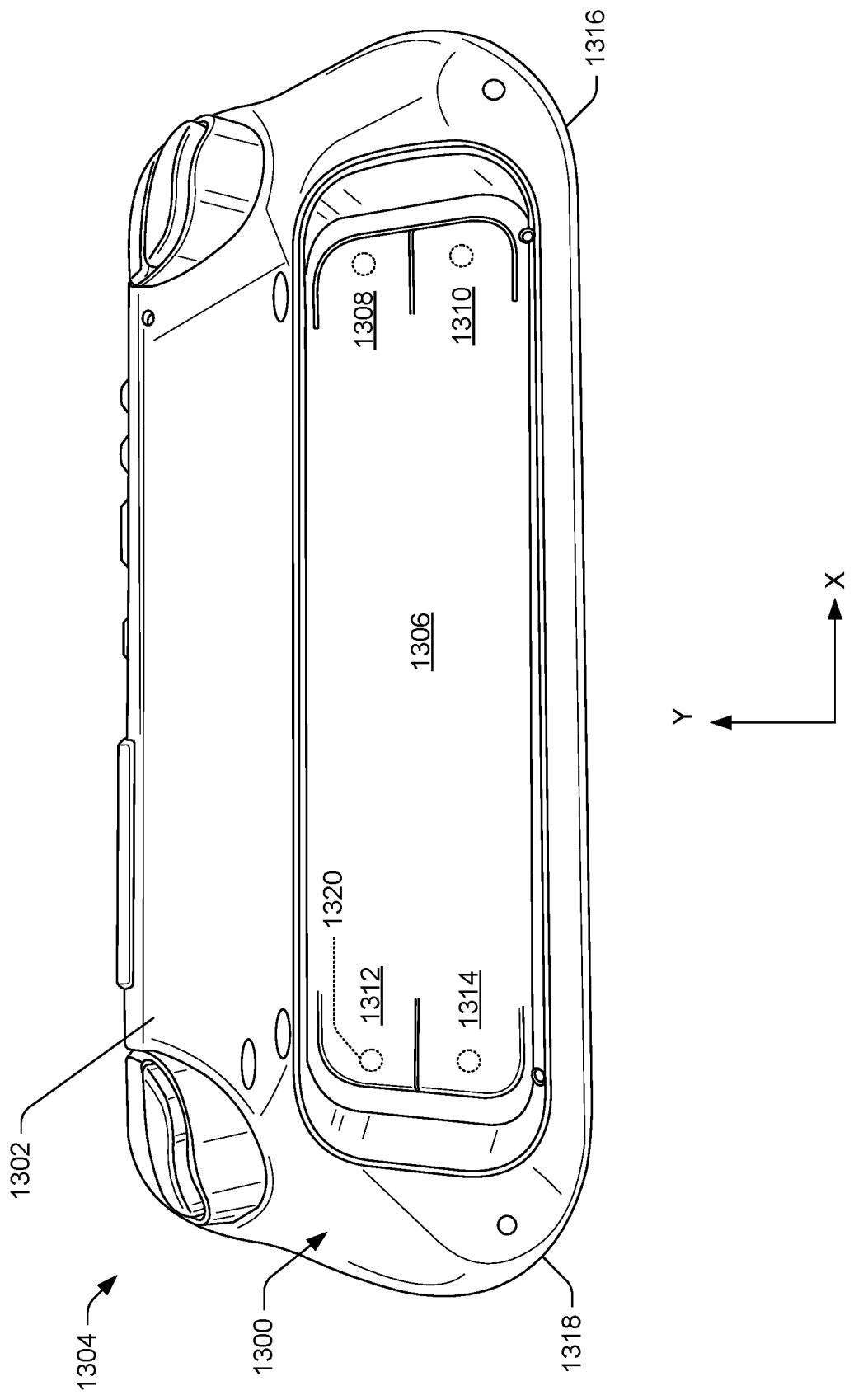
FIG. 13 illustrates a rear view of an example handheld controller, such as the handheld controller of FIG. 9, that includes, in part, one or more rear-surface controls operable at least in part by a first back cover. The first back cover may be interchangeable with other back covers to provide the handheld controller with different functionalities.
Figure 14:
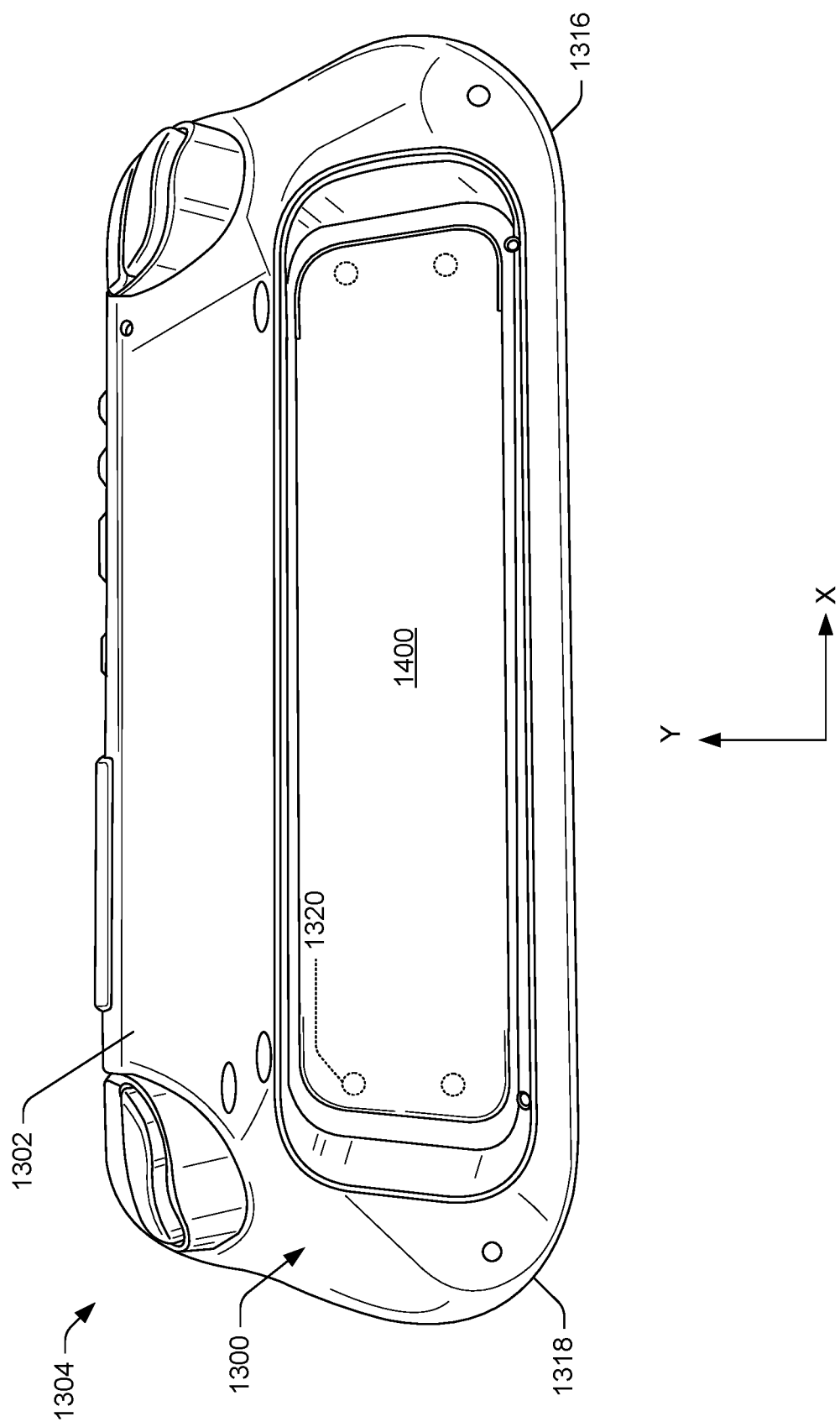
FIG. 14 illustrates a rear view of the handheld controller of FIG. 13, that includes, in part, a second back cover. The second back cover may be interchangeable with the first back cover of FIG. 13 to defeature certain controls and/or functionalities of the handheld controller.

FIGS. 13-15 illustrate a back 1300 of a controller body 1302 of a controller 1304 including various back covers attached to the controller body 1302. In some instances, the back 1300 may represent a back of the controller 100 or the back of the controller 900. The back 1300 of the controller body 1302 includes a receiver for receiving different types of back covers. Different covers may therefore be configured to mount, couple, or attach to the back 1300. In some instances, the back covers may couple to the back 1300 via latch mechanisms, magnets, fasteners, and/or any combination thereof. Furthermore, the controller 1304 may be configured to acquire data indicative of which back cover is currently coupled to the controller 1304. The controller 1304 or another system may then use this data to make this determination, which in turn may be used by an application being operated via the controller 1304.

Beginning with FIG. 13, a first cover 1306 is shown attached to the controller body 1302. The first cover 1306 may include four buttons, two on a left-hand side, such as a first control 1308 and a second control 1310, and two on a right-hand side, such as a first control 1312 and a second control 1314. In some instances, when the controller 1304 is held by the user, the buttons located on the left-hand side may be operated or controlled by left fingers of the user (e.g., ring, middle, index), while buttons located on the right-hand side may be operated or controlled by right fingers of the user (e.g., ring, middle, index.). Parting lines on the first cover 1306 may separate the controls such that the controls are separately addressable. For example, the user may hold the controller 1304 via a left handle 1316 and a right handle 1318. In such position, the user may press the buttons.

The buttons on the left and right sides of the controller body 1302 may individually be depressible for engaging or activating switches disposed within a compartment of the controller 1304. Individual buttons, or respective portions of the first cover 1306, may engage with respective switches 1320 within the compartment. For example, switches 1320 shown in dashed lines may be disposed within the compartment, where the compartment underlies the first cover 1306 when the first cover 1306 attaches to the controller body 1302. In some instances, the switches 1320 may include tactile or mechanical switches configured to sense or detect a press and/or may include a force sensing resistor (FSR) having a transducer that has an electrical resistance that changes based on the applied force that it experiences.

Removing the first cover 1306 may permit access to the compartment, which in some instances, may include batteries and the switches 1320. Accordingly, by pressing on the controls, the controls themselves or portions of the controls such as projections may engage with the switches for causing certain actions to be performed. Moreover, although FIG. 13 illustrates the first cover 1306 includes four buttons, or two buttons disposed on each side, the first cover may include any number of buttons and/or the buttons may be located in other places. In such instances, the controller 1304 may include a corresponding number of switches placed and located beneath the buttons.

FIG. 14 illustrates a second cover 1400 attached to the controller body 1302. Compared to the first cover 1306, the second cover 1400 may not include any buttons capable of depressing, or configured to depress, the switches 1320. For example, the switches 1320 are still shown in FIG. 14, and within the controller body 1302, to indicate their presence beneath the second cover 1400. However, the second cover 1400 may not include buttons or portions of the second cover 1400 may not be depressible to engage the switches 1320. In some instances, a user may swap the first cover 1306 for the second cover 1400 based on a current application (e.g., game title) that the user is playing, based on comfort of the user, and/or for any other reason.

Given that the second cover 1400 does not include features to engage the switches 1320, the second cover 1400 may be said to deactivate, de-feature, or disable the switches 1320 within the compartment. That is, the controller 1304 may still include the switches 1320 within the compartment, but coupling the second cover 1400 to the controller body 1302 may prevent the switches 1320 being activated. In some instances, the user may swap the second cover 1400 with the first cover 1306 in instances where the game or application does not require input from the buttons on the back cover and/or in instances where the user does not want to utilize the buttons on the back cover.

Additionally, in some instances, being as the switches 1320 are not actuatable when the second cover 1400 is coupled to the controller may deactivate the switches 1320 (e.g., refrain from supplying power to electronics associated with the switches 1320) to save or reduce power. In other words, based on the back cover coupled to the controller body 1302, the controller may be configured accordingly to sense certain inputs and/or defeature certain functionalities.

FIG. 15 illustrates a third cover 1500 attached to the controller body 1302. In some instances, the third cover 1500 may include buttons operable by a left hand and a right hand of the user. In some instances, the user may swap the third cover 1500 for the first cover 1306 or the second cover 1400 based on a current application (e.g., game title) that the user is playing, based on comfort of the user, and/or for any other reason. Additionally, the third cover 1500 may include additional electronics for providing the controller with addition features and/or functionalities. For example, the third cover 1500 may include haptic actuators for providing vibrational feedback to the user. Additionally, or alternatively, the third cover 1500 may include batteries for extending a charge or battery life of the controller 1304. However, the third cover 1500 may include additional electronic components that are operable by the user and/or which increase functionalities of the controller 1304.

In such instances, the third cover 1500 may include connectors for communicatively coupling with the controller 1304. For example, a connector of the third cover 1500 may connect with a connector disposed within the compartment of the controller 1304 for providing data, transferring power, and enabling a functionality of the third cover 1500, vice versa.

In some instances, controls of the handheld controller may be adjusted to increase and/or decrease their sensitivity. In some instances, the controls may be completely disabled, such that their sensitivity is zero (or substantially zero). For example, the handheld controller may include a front-surface control, such as a trackpad. The trackpad may include a touch sensor to sense or determine a presence, location, and/or gesture provided by the user. The trackpad may also be depressible (e.g., clickable). In some instances, the user may adjust a sensitivity of the trackpad to detect presses. Stated alternatively, the user may adjust an amount of force with which the user has to press on the control to depress the trackpad. In this manner, a sensitivity required to depress the trackpad, or depress switches beneath the trackpad, may be adjusted according to the game, application, and/or user preferences.

In some instances, a mechanical feature may control, or be used to control, the sensitivity of the trackpad to detect presses. For example, a knob of the handheld controller and may be slidable, twistable, rotatable, or otherwise actuatable for adjusting the sensitivity. In some instances, the knob may couple to/with a rotating dial mechanism disposed beneath the trackpad (or within the housing of the controller). The rotating dial mechanism may vary an amount of force required by the user to depress the trackpad. For example, rotating the dial may change a placement of supporting arms on a circular frame, which, in turn, adjusts how easy or hard it is to depress the trackpad. For example, at a first position, the knob may permit the trackpad to be easily depressed with little force. At a second position the knob may disable or virtually disable the depressible nature of the trackpad. At the second position, or when the trackpad is harder to depress, the user may be required to apply a greater amount of force to depress the trackpad as compared to when the trackpad is easily depressible (e.g., in the first position). In some instances, the first position and the second position may be considered extremes, or ends, of the range of sensitivity. The knob, however, may be adjusted to one or more intermediate positions between the first position and the second position to modify the sensitivity required to depress the trackpad.

While traditional handheld controllers include controls that are selectable, combining a control that has a switch, to identify selection of the control, with touch-sensing functionality (and its associated sensitivity) may increase the amount and richness of gestures that may be interpreted on the handheld controller. Further, these gestures may enrich the operation of the game or other applications being controlled by the handheld controller. Adjusting a sensitivity of the control, and swapping certain controls for one another, may further increase the richness.

Figure 16A:
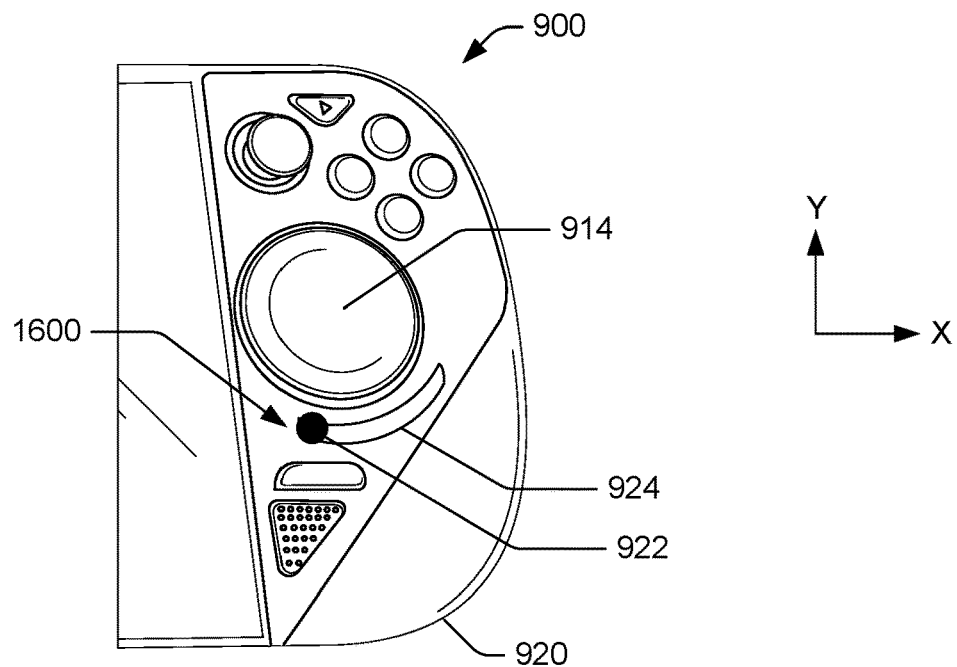
FIG. 16A illustrates a front perspective view of the handheld controller of FIG. 9, that includes, in part, a knob for adjusting a sensitivity of the one or more front-surface controls.
Figure 16B:
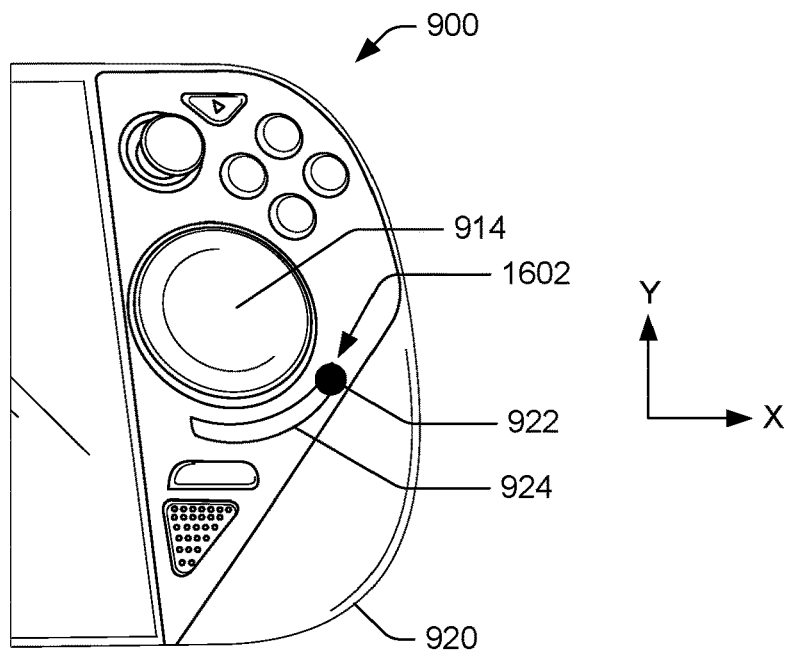
FIG. 16B illustrates a front perspective view of the handheld controller of FIG. 9, that includes, in part, the knob for adjusting the sensitivity of the one or more front-surface controls.

FIGS. 16A and 16B illustrate the knob 922 of the controller 900 in different positions for adjusting a sensitivity of a control, such as the right trackpad 914. As introduced and discussed above with regard to FIG. 9, the knob 922 may slide within the channel 924 for adjusting or changing a sensitivity of the right trackpad 914. For example, the right trackpad 914 may be depressible and moving the knob 922 within the channel 924 may adjust an amount of force required to depress the right trackpad 914 and engage one or more switches. As discussed in detail herein, the knob 922 may interact with one or more features, such as a radial dial mechanism, disposed beneath the right trackpad 914 for adjusting the sensitivity.

In FIG. 16A, the knob 922 disposed at a first location 1600 within the channel 924. The first location 1600 may correspond to a first sensitivity of the right trackpad 914 being depressible (e.g., how hard the user must press). For example, the first location 1600 is shown being at a far-left location within the channel 924 (i.e., the knob 922 cannot be moved any further left). In some instances, the first location 1600 may represent a first extreme of the sensitivity. For example, when the knob 922 is at the first location 1600, the sensitivity may be at its greatest and the right trackpad 914 may easily depress with a little amount of force. As such, the right trackpad 914 may be sensitive to being depressed by the user.

In FIG. 16B, the knob 922 is disposed at a second location 1602 within the channel 924. The second location 1602 may correspond to a second sensitivity of the right trackpad 914 being depressible. For example, the second location 1602 is shown being at a far-right location within the channel 924 (i.e., the knob cannot be moved any further right). In some instances, the second location 1602 may represent a second extreme of sensitivity. For example, when the knob 922 is at the second location 1602, the sensitivity may be at its lowest and the right trackpad 914 may require a larger amount of force to be depressed. In such instances, the user may be required to act on the right trackpad 914 with a greater amount of force, than when the knob 922 is in the first location 1600, to depress the right trackpad 914. The far-right position may also represent a scenario where the right trackpad 914 is not capable of being depressed, and as such, the depressible nature of the right trackpad 914 may be defeatured or disabled. Regardless of the sensitivity, or the position of the knob 922, the right trackpad 914 may still be capable of detecting touch input. In some instances, the sensitivity of the right trackpad 914 being depressible may not affect the sensitivity of the right trackpad 914 detecting touch input.

In some instances, the front 904 of the controller 900 may include visual indicators that illustrate the sensitivity of the right trackpad 914. For example, a visual indicator, such as a less sign ("−") may be located adjacent to a left-hand side of the channel 924, while a visual indicator, such as a plus sign ("+") may be located adjacent to a right-hand sign of the channel 924. Such indicators may indicate to the user how to lessen or increase the sensitivity of the right trackpad 914.

Although FIGS. 16A and 16B illustrate adjusting a sensitivity of the right trackpad 914, other controls of the controller 900 (or the controller 100) may be adjusted in a similar manner. For example, a sensitivity of the left trackpad 908 being depressed may be adjusted. Additionally, rather than the controller 900 including the knob 922 for adjusting the sensitivity, other mechanisms such as buttons, screws, pins, motors, or levers may be used to adjust the sensitivity of the control. Moreover, rather than the knob 922 sliding within the channel 924 to adjust the sensitivity, the knob 922 may be located elsewhere on the controller body 902 and/or embodied in different slides, channels, tracks for adjusting the sensitivity.

The knob 922 may also be adjustable to any location along the channel 924 for configuring the right trackpad 914 to a particular sensitivity. That is, although FIG. 16A and FIG. 16B illustrate the knob 922 disposed at outer extremes of the channel 924, the knob 922 may be located at any intermediate position within the channel 924 and the right trackpad 914 may have a sensitivity corresponding to the intermediate position. As such, the sensitivity of the right trackpad 914 (or other controls) may be incrementally adjusted.

Figure 17A:
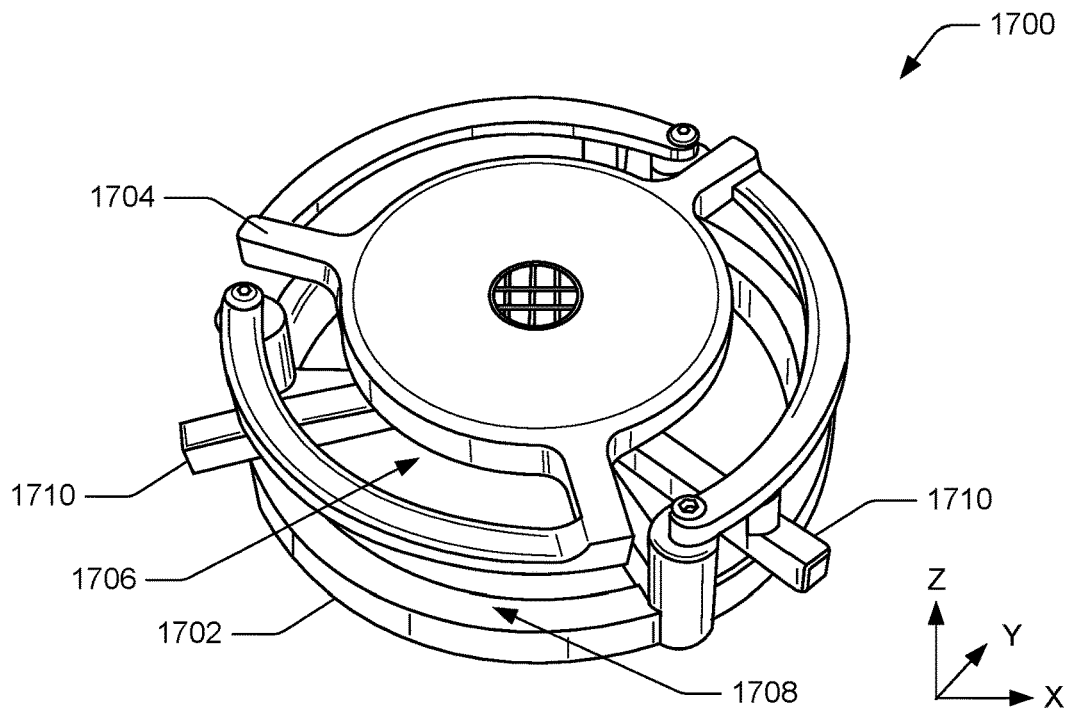
FIG. 17A illustrates a first perspective view of a dial mechanism for adjusting a sensitivity of the one or more front-surface controls.
Figure 17B:
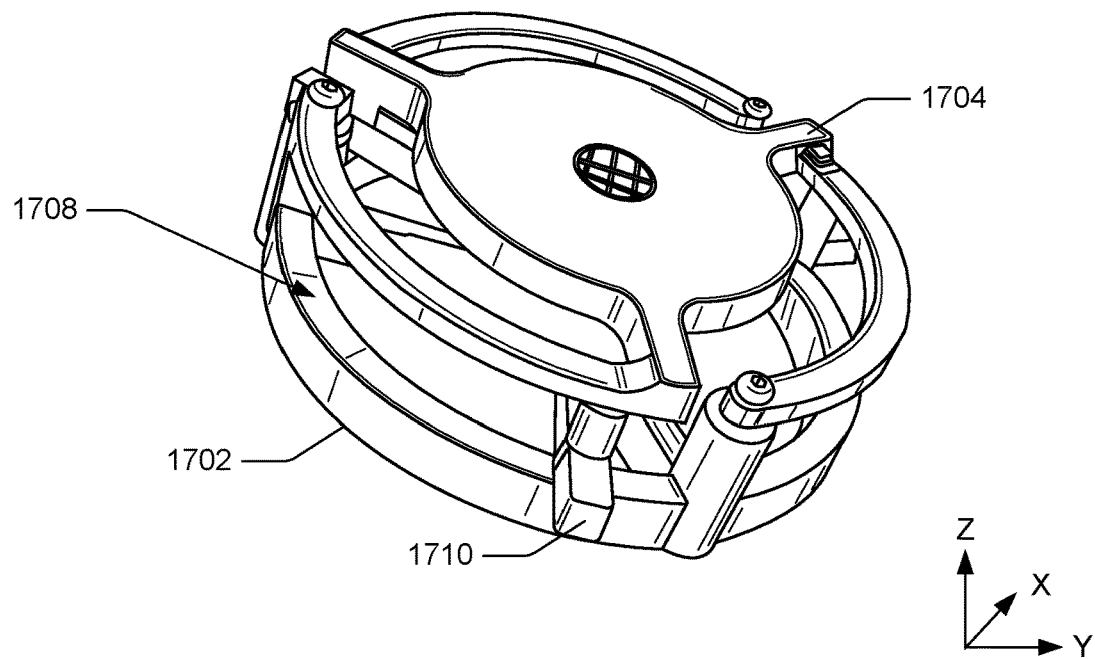
FIG. 17B illustrates a second perspective view of the dial mechanism of FIG. 17A for adjusting the sensitivity of the one or more front-surface controls.

FIGS. 17A and 17B illustrate perspective views of a rotating dial mechanism 1700. The rotating dial mechanism 1700 may be operably coupled to the knob 922 for adjusting a sensitivity of a control, such as the right trackpad 914. As shown, the rotating dial mechanism 1700 may include a frame 1702 having a top surface 1704, a dial 1706, and channels 1708 within which arms 1710 of the dial 1706 are configured to maneuver. The top surface 1704 may couple to a bottom of the right trackpad 914, or a bottom of a touch sensor of the right trackpad 914. The top surface 1704 may therefore be disposed vertically beneath the right trackpad 914. In some instances, the right trackpad 914 and/or the rotating dial mechanism 1700 may be integrated or combined as a single component within a controller, or the controller body. Combining a control that has a switch, to identify selection of the control, with touch-sensing functionality may increase the amount and richness of gestures that may be interpreted on the handheld controller. Further, these gestures may enrich the operation of the game or other applications being controlled by the controller.

The dial 1706 operably couples to the knob 922, as discussed above with regard to FIGS. 16A and 16B. For example, an end of the knob 922 disposed within the controller body 902 may attach or adhere to the dial 1706, such as an arm 1710 of the dial 1706. The dial 1706 may be configured to rotate and maneuvering the knob 922, as discussed above with regard to FIGS. 16A and 16B, may cause the dial 1706 to rotate within the rotating dial mechanism 1700. For example, the dial 1706 may rotate around a central axis, or hub. As the dial 1706 rotates, the arms 1710 may move within the channels 1708, respectively. For example, the rotating dial 1706 may include three arms 1710, each of which are disposed within a respective channel 1708.

Each of the arms 1710 may have a limited range of movement within the channels 1708 in the vertical direction. For example, on either end of the channels 1708, the arm 1710 may be prevented from rotating or moving any further via side or end walls. As the arms 1710 slide or are rotating in a first direction within the channel 1708, however, a distance between the arms 1710 and top and bottom surfaces of the channel 1708 may lessen (e.g., the channels 1708 may shrink or constrict). The arm 1710 may then come into contact with the top and bottom surfaces of the channel 924 and become restrained therebetween. The restraint of the arm 1710 within the channel 1708 may reduce an amount the right trackpad 914 is configured to depressible and in turn, reduce a sensitivity of the right trackpad. In such instances, the right trackpad 914 may be harder to depressible for engaging one or more switches. Spring or other biasing members may provide mechanical action to the depressible nature of the right trackpad 914.

Conversely, moving the arms in a second, opposite direction may free the arms from the top and bottom surfaces of the channel 1708 and permit the right trackpad 914 to be easily depressible. That is, because the arms 1710 of the dial 1706 may no longer be restrained between the top surface and the bottom surface of the channel 1708, the arms 1710 may be vertically depressed, and in turn, the right trackpad 914 may be depressed. However, the arms 1710 may be positioned at other locations within the channels for modifying, or incrementally adjusting the sensitivity of the right trackpad 914 being depressible.

Collectively, each of the arms 1710 may be disposed within a respective channel 1708 for engaging with respective top and bottom surfaces of the channels 1708. In this way, the amount of force required to depress the right trackpad may be uniform across the surface of the right trackpad 914, or at various locations on the top of the right trackpad 914. Furthermore, although FIGS. 17A and 17B illustrate the dial 1706 having three arms, the dial 1706 may include less than or more than three arms 1710 for engaging with respective channels. Additionally, one or more mechanical within the controller may provide tactile or mechanical motion to the right trackpad 914 or the rotating dial mechanism 1700 to allow the right trackpad 914 to be depressible.

Figure 18:
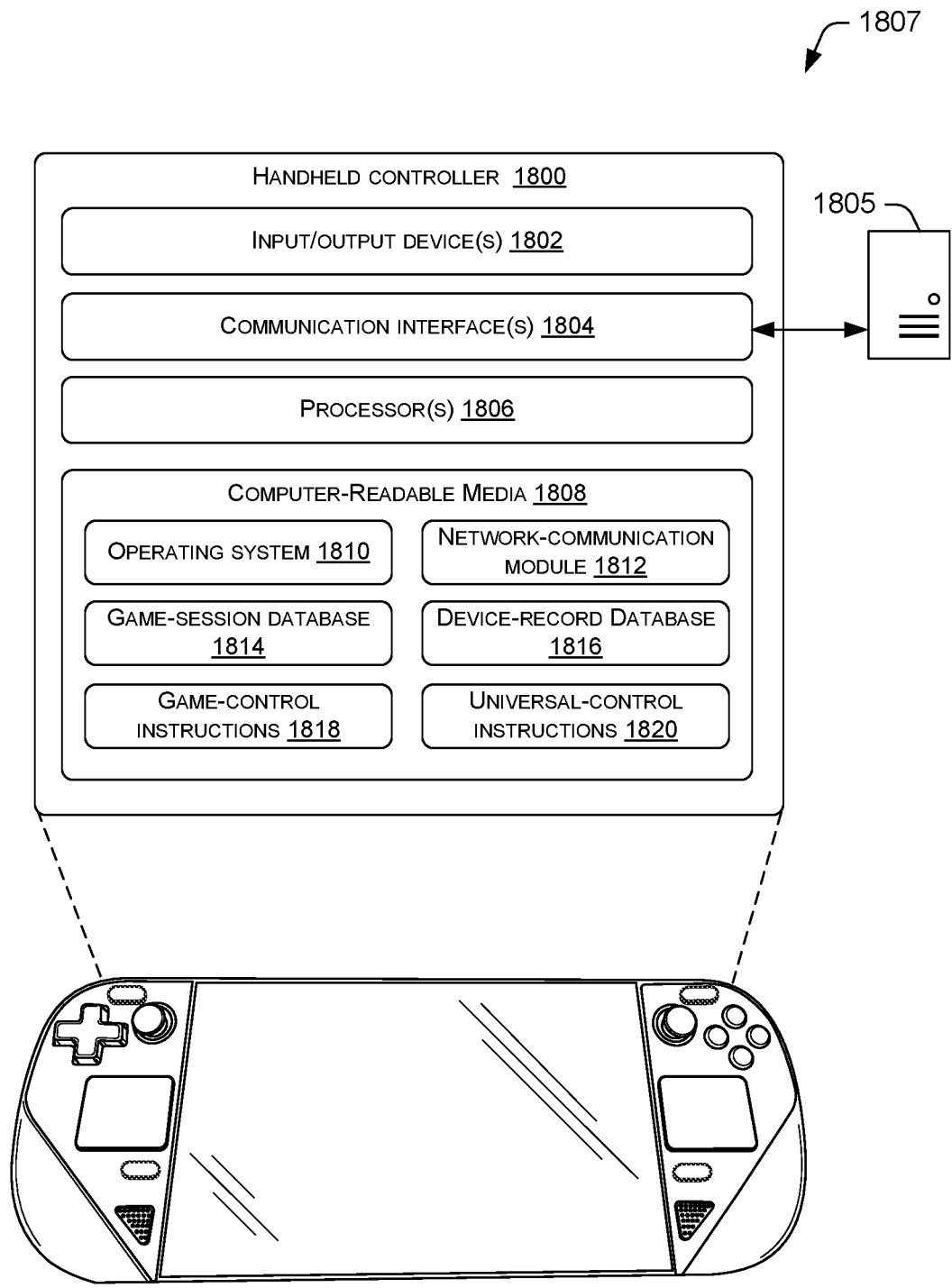
FIG. 18 illustrates selected functional components of an example handheld controller.

FIG. 18 illustrates example computing components of a controller 1800, such as the controller 100 or the 900. As illustrated, the handheld controller 1800 includes one or more input/output (I/O) devices 1802, such as the controls described above (e.g., joysticks, trackpads, triggers, etc.), potentially any other type of input or output devices. For example, the I/O devices 1802 may include one or more microphones to receive audio input, such as user voice input. In some implementations, one or more cameras or other types of sensors (e.g., inertial measurement unit (IMU)) may function as input devices to receive gestural input, such as motion of the controller 1800. In some embodiments, additional input devices may be provided in the form of a keyboard, keypad, mouse, touch screen, joystick, control buttons and the like. The input device(s) may further include control mechanisms, such as basic volume control button(s) for increasing/decreasing volume, as well as power and reset buttons.

The output devices, meanwhile, may include a display, a light element (e.g., LED), a vibrator to create haptic sensations, a speaker(s) (e.g., headphones), and/or the like. There may also be a simple light element (e.g., LED) to indicate a state such as, for example, when power is on. While a few examples have been provided, the handheld controller may additionally or alternatively include any other type of output device.

In some instances, output by the one or more output devices may be based on input received by one or more of the input devices. For example, selection of a control may result in the output of a haptic response by a vibrator located adjacent (e.g., underneath) the control or at any other location. In some instances, the output may vary based at least in part on a characteristic of a touch input on a touch sensor, such as the touch sensor associated with the control. For example, a touch input at a first location on the touch sensor may result in a first haptic output, while a touch input at a second location on the touch sensor may result in a second haptic output. Furthermore, a particular gesture on the touch sensor may result in a particular haptic output (or other type of output). For instance, a swipe gesture on the control may result in a first type of haptic output, while a tap on the control (detected by the touch sensor) may result in a second type of haptic output, while a hard press of the control may result in a third type of haptic output.

In addition, the controller 1800 may include one or more communication interfaces 1804 to facilitate a wireless connection to a network and/or to one or more remote systems and/or devices 1805 (e.g., a host computing device executing an application, a game console, etc.). The communication interfaces 1804 may implement one or more of various wireless technologies, such as Wi-Fi, Bluetooth, radio frequency (RF), and so on. It is to be appreciated that the controller 1800 may further include physical ports to facilitate a wired connection to a network, a connected peripheral device, or a plug-in network device that communicates with other wireless networks.

In the illustrated implementation, the handheld controller 1800 further includes one or more processors 1806 and computer-readable media 1808. In some implementations, the processors(s) 1806 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 1806 may possess its own local memory, which also may store program modules, program data, and/or one or more operating systems.

The computer-readable media 1808 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 1808 may be implemented as computer-readable storage media ("CRSM"), which may be any available physical media accessible by the processor(s) 1806 to execute instructions stored on the computer-readable media 1808. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 1806.

Several modules such as instruction, datastores, and so forth may be stored within the computer-readable media 1808 and configured to execute on the processor(s) 1806. A few example functional modules are shown as stored in the computer-readable media 1808 and executed on the processor(s) 1806, although the same functionality may alternatively be implemented in hardware, firmware, or as a system on a chip (SOC).

An operating system module 1810 may be configured to manage hardware within and coupled to the controller 1800 for the benefit of other modules. In addition, the computer-readable media 1808 may store a network-communications module 1812 that enables the controller 1800 to communicate, via the communication interfaces 1804, with one or more other devices 1805, such as a personal computing device executing an application (e.g., a game application), a game console, a remote server, or the like. The computer-readable media 1808 may further include a game-session database 1814 to store data associated with a game (or other application) executing on the handheld controller or on a computing device to which the controller 1800 couples. The computer-readable media 1808 may also include a device-record database 1816 that stores data associated with devices to which the controller 1800 couples, such as the personal computing device, game console, remote server or the like. The computer-readable media 1808 may further store game-control instructions 1818 that configure the controller 1800 to function as a gaming controller, and universal-control instructions 1820 that configure the controller 1800 to function as a controller of other, non-gaming devices.

In some instances, some or all of the components (software) shown in FIG. 18 could be implemented on another computing device(s) 1805 that is part of a controller system 1807 including the controller. In such instances, the processes and/or functions described herein may be implemented by other computing devices 1805 and/or the controller 1800. By way of example, the controller 1800 may couple to a host PC or console in the same environment, a computing device(s)/server and provide the device 1805 with data indicating accessories couples to the controller. The controller 1800, for example, may transmit data indicating or identifying the accessor(ies) coupled to the controller 1800. Such data may be used by the computing device(s) 1805 during gameplay experiences or may be used by the computing device(s) when determining how to interpret the data received from the controller 1800 (e.g., which buttons are pressed, what the button presses mean, etc.). The computing device 1805 may determine, based on this data, which accessor(ies) couples to the controller. In another example, the computing device 1805 may receive data indicating an adjusted sensitivity of a control for use in interpreting data received from the controller 1800 and causing one or more actions to be performed. However, while a few scenarios are described, the controller 1800 and the computing device(s) 1805 may communicatively couple with one another for transmitting and receiving data such that the controller 1800, the computing device 1805, and/or other devices of the controller system 1807 may perform the operations and processes described herein.

EXAMPLE CLAUSES

1. A controller including: a controller body including a back; a first receptacle disposed on the back of the controller body, the first receptacle being configured to receive a first grip, wherein the first receptacle includes a first attachment mechanism configured to engage with a second attachment mechanism of the first grip for coupling the first grip to the controller body; and a second receptacle disposed on the back of the controller body, the second receptacle being configured to receive a second grip, wherein the second receptacle includes a third attachment mechanism configured to engage with a fourth attachment mechanism of the second grip for coupling the second grip to the controller body.
2. The controller of clause 1, wherein: the controller body further includes a left handle portion and a right handle portion; the first receptacle is disposed proximate to the left handle portion; and the second receptacle is disposed proximate to the right handle portion.
3. The controller of clause 1, wherein: the first attachment mechanism includes a first magnetic element; the second attachment mechanism includes a second magnetic element engageable with the first magnetic element; the third attachment mechanism includes a third magnetic element; and the fourth attachment mechanism includes a fourth magnetic element engageable with the third magnetic element.
4. The controller of clause 1, wherein at least one of: the first grip is one of a first plurality of grips that are each different with respect to at least one of contour, shape, or size, each of the first plurality of grips configured to be received within the first receptacle; the second grip is one of a second plurality of grips that are each different with respect to at least one of contour, shape, or size, each of the second plurality of grips configured to be received within the second receptacle.
5. The controller of clause 1, wherein at least one of: the first grip includes one or more first buttons; or the second grip includes one or more second buttons.
6. The controller of clause 1, wherein: the first receptacle includes a first connector that communicatively couples to a second connector of the first grip; and the second receptacle includes a third connector that communicatively couples to a fourth connector of the second grip.
7. The controller of clause 1, wherein at least one of: the first receptacle is recessed into the back of the controller body; or the second receptacle is recessed into the back of the controller body.
8. A controller including: a controller body including a back; a compartment disposed in the back of the controller body; one or more switches disposed within the compartment; and a cover configured to couple to the back of the controller body, the cover being disposed over the compartment when coupled to the back, and wherein the cover is interchangeable with one or more additional covers for altering a functionality of the controller.
9. The controller of clause 8, wherein the cover includes one or more actuatable areas that when pressed, cause the one or more switches to be engaged.
10. The controller of clause 8, wherein the one or more switches include at least one of a tactile switch or a force sensing resistor.
11. The controller of clause 8, wherein the cover is configured to couple to the back of the controller body between a left handle portion and a right handle portion of the controller body.
12. The controller of clause 8, wherein the controller body includes a first attachment mechanism and the cover includes a second attachment mechanism, wherein an engagement between the first attachment mechanism and the second attachment mechanism couples the cover to the controller body.
13. The controller of clause 8, wherein the one or more additional covers include at least one of: a first cover that prevents the one or more switches from being engaged when the cover is pressed; or a second cover including at least one of batteries or haptic actuators.
14. A controller system including: one or more processors; and a controller including: a controller body; a trackpad configured to provide, to the one or more processors, touch data indicative of a touch input; a switch residing at least partly beneath the trackpad and configured to provide, to the one or more processors, selection data indicative of a press at the trackpad; and a rotating dial mechanism disposed at least partly beneath the trackpad and configured to adjust an amount of force of the press that is required for the switch to detect the press.
15. The controller system of clause 14, wherein the trackpad is disposed on a front of the controller body.
16. The controller system of clause 14, wherein the rotating dial mechanism includes: a frame having one or more channels; a center dial; and one or more arms extending from the central dial and disposed within the one or more channels.
17. The controller system of clause 16, wherein: individual channels of the one or more channels include a first end and a second end; and individual arms of the one or more arms move within corresponding ones of the individual channels, between the first end and the second end, to adjust the amount of force that is required for the switch to detect the press.

18. The controller system of clause 16, further including: a channel disposed through a front cover of the controller body; a knob disposed within the channel and operably coupling to the rotating dial mechanism, wherein the knob is moveable within the channel to adjust the amount of force that is required for the switch to detect the press.

19. The controller system of clause 14, wherein the amount of force is adjustable between: a first amount of force that is required for the switch to detect the press; and a second amount of force that is required for the switch to detect the press.

20. A controller including: a controller body having a front surface; and a speaker residing on the front surface of the controller body, the speaker being actuatable to alter an audio characteristic of an executing application.

21. The controller of clause 20, wherein the speaker is a first speaker, the controller further including a second speaker residing on the front surface of the controller body, the second speaker being actuatable to alter the audio characteristic, or an additional audio characteristic, of the executing application.

22. The controller of clause 21, wherein: the first speaker is located on a first side of the controller body; and the second speaker is location on a second side of the controller body.

23. The controller of clause 20, the controller further including a control residing on the front surface of the controller body, the control being configured to provide, to one or more processors, touch data indicative of a touch input, wherein the touch data alters an additional audio characteristic of the executing application.

24. The controller of clause 23, further including non-transitory computer readable media, storing instructions that when executed by one or more processors, causes the one or more processors to perform acts including: determining, that the touch data is received within a threshold amount of time from detecting an actuation of the speaker; and based at least in part on the determining, causing the audio characteristic to be altered.

25. The controller of clause 23, wherein: the speaker is operable by a first thumb of a user; and the control is operably by a second thumb of the user.

26. The controller of clause 20, wherein the audio characteristic includes at least one of: increasing volume; decreasing the volume; muting the volume; or unmuting the volume.

Unless otherwise indicated, all numbers expressing quantities, properties, conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e. denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

While various examples and embodiments are described individually herein, the examples and embodiments may be combined, rearranged and modified to arrive at other variations within the scope of this disclosure. In addition, although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A controller system comprising:
   one or more processors;
   a controller comprising:
      a controller body having a front surface;
      a first speaker disposed on the front surface and within a left half of the front surface;
      a first sensor associated with the first speaker and configured to detect finger contact on the first speaker, wherein the first sensor comprises at least one of:
         a first speaker coil of the first speaker; or
         a first inductive sensor coupled to the first speaker coil;
      a second speaker disposed on the front surface and within a right half of the front surface; and
      a second sensor associated with the second speaker and configured to detect finger contact on the second speaker, wherein the second sensor comprises at least one of:
         a second speaker coil of the second speaker; or
         a second inductive sensor coupled to the second speaker coil; and
   non-transitory computer readable media storing instructions, that when executed by the one or more processors, cause the one or more processors to perform acts comprising:
      receiving, from at least one of the first sensor or the second sensor, inductance data indicating a change in inductance based on a finger moving into proximity to at least one of the first speaker coil or the second speaker coil; and
      adjusting a volume of audio content being output by the first speaker and the second speaker based at least in part on the inductance data.

2. The controller system of claim 1, wherein at least one of:
   the inductance data is received from the second sensor; and
   the adjusting of the volume comprises increasing the volume; or
   the inductance data is received from the first sensor; and
   the adjusting of the volume comprises decreasing the volume.

3. The controller system of claim 1, wherein at least one of:
the first inductive sensor is part of a first amplifier of the first speaker; or
the second inductive sensor is part of a second amplifier of the second speaker.

4. The controller system of claim 1, wherein:
the acts further comprise determining, based at least in part on the inductance data, that an inductance value sensed by at least one of the first sensor or the second sensor satisfies a threshold; and
the adjusting of the volume is based on the inductance value satisfying the threshold.

5. A method comprising:
receiving, by a processor, inductance data from a sensor associated with a speaker disposed on a controller body of a controller, the sensor comprising at least one of a speaker coil of the speaker or an inductive sensor coupled to the speaker coil, and the inductance data indicates a change in inductance based on a finger moving into proximity to the speaker coil; and
causing, by the processor, a characteristic of audio content being output by the speaker to be adjusted based at least in part on the inductance data.

6. The method of claim 5, wherein the causing the characteristic of the audio content to be adjusted comprises at least one of:
increasing a volume of the audio content;
decreasing the volume;
muting the volume; or
unmuting the volume.

7. The method of claim 5, wherein:
the speaker is a first speaker of a pair of speakers disposed on a front surface of the controller body, the first speaker disposed within a right half of the front surface; and
the causing the characteristic of the audio content to be adjusted comprises increasing a volume of the audio content.

8. The method of claim 5, wherein:
the speaker is a first speaker of a pair of speakers disposed on a front surface of the controller body, the first speaker disposed within a left half of the front surface; and
the causing the characteristic of the audio content to be adjusted comprises decreasing a volume of the audio content.

9. The method of claim 5, wherein the inductive sensor is part of an amplifier of the speaker.

10. The method of claim 5, further comprising:
determining, based at least in part on the inductance data, that an inductance value sensed by the sensor satisfies a threshold,
wherein the causing the characteristic of the audio content to be adjusted is based on the inductance value satisfying the threshold.

11. The method of claim 5, wherein:
the speaker comprises a first speaker;
the sensor comprises a first sensor;
the inductance data is first inductance data;
the finger is a first finger;
the method further comprises:
receiving, by the processor, second inductance data from a second sensor associated with a second speaker disposed on the controller body, the second sensor comprising at least one of a second speaker coil of the second speaker or a second inductive sensor coupled to the second speaker coil, and the second inductance data indicates a change in inductance based on a second finger moving into proximity to the second speaker coil; and
determining, by the processor, and based at least in part on the first inductance data and the second inductance data, that the first finger is contacting the first speaker at substantially the same time as the second finger is contacting the second speaker; and
the causing the characteristic of the audio content to be adjusted comprises at least one of muting a volume of the audio content or unmuting the volume.

12. A controller system comprising:
one or more processors;
a controller comprising:
a controller body;
a speaker disposed on the controller body; and
a sensor associated with the speaker and configured to detect finger contact on the speaker, wherein the sensor comprises at least one of:
a speaker coil of the speaker; or
an inductive sensor coupled to the speaker coil; and
non-transitory computer readable media storing instructions, that when executed by the one or more processors, cause the one or more processors to perform acts comprising:
receiving, from the sensor, inductance data indicating a change in inductance based on a finger moving into proximity to the speaker coil; and
causing a characteristic of audio content being output by the speaker to be adjusted based at least in part on the inductance data.

13. The controller system of claim 12, wherein:
the speaker comprises a first speaker disposed on a front surface of the controller body and within a left half of the front surface;
the sensor comprises a first sensor;
the controller further comprises:
a second speaker disposed on the front surface and within a right half of the front surface; and
a second sensor associated with the second speaker and configured to detect finger contact on the second speaker; and
the causing the characteristic of the audio content to be adjusted comprises decreasing a volume of the audio content.

14. The controller system of claim 13, wherein the second sensor comprises at least one of:
a second speaker coil of the second speaker; or
a second inductive sensor coupled to the second speaker coil.

15. The controller system of claim 12, wherein:
the speaker comprises a first speaker disposed on a front surface of the controller body and within a right half of the front surface;
the sensor comprises a first sensor;
the controller further comprises:
a second speaker disposed on the front surface and within a left half of the front surface; and
a second sensor associated with the second speaker and configured to detect finger contact on the second speaker; and
the causing the characteristic of the audio content to be adjusted comprises increasing a volume of the audio content.

16. The controller system of claim 15, wherein the second sensor comprises at least one of:
a second speaker coil of the second speaker; or
a second inductive sensor coupled to the second speaker coil.

17. The controller system of claim 12, wherein the causing the characteristic of the audio content to be adjusted comprises at least one of:
increasing a volume of the audio content;
decreasing the volume;
muting the volume; or
unmuting the volume.

18. The controller system of claim 12, wherein the inductive sensor is part of an amplifier of the speaker.

19. The controller system of claim 12, wherein:
the acts further comprise determining, based at least in part on the inductance data, that an inductance value sensed by the sensor satisfies a threshold; and
the causing the characteristic of the audio content to be adjusted is based on the inductance value satisfying the threshold.

20. The controller system of claim 12, wherein:
the speaker comprises a first speaker;
the sensor comprises a first sensor;
the inductance data is first inductance data;
the finger is a first finger;
the controller further comprises:
a second speaker disposed on the controller body; and
a second sensor associated with the second speaker and configured to detect finger contact on the second speaker, wherein the second sensor comprises at least one of:
a second speaker coil of the second speaker; or
a second inductive sensor coupled to the second speaker coil;
the acts further comprise:
receiving, from the second sensor, second inductance data indicating a change in inductance based on a second finger moving into proximity to the second speaker coil; and
determining, based at least in part on the first inductance data and the second inductance data, that the first finger is contacting the first speaker at substantially the same time as the second finger is contacting the second speaker; and
the causing the characteristic of the audio content to be adjusted comprises at least one of muting a volume of the audio content or unmuting the volume.

* * * * *